US008489665B2

(12) United States Patent
Sato et al.

(10) Patent No.: US 8,489,665 B2
(45) Date of Patent: Jul. 16, 2013

(54) COMMUNICATION APPARATUS, METHOD OF CHECKING RECEIVED DATA SIZE, MULTIPLE DETERMINING CIRCUIT, AND MULTIPLE DETERMINATION METHOD

(75) Inventors: Fuyuta Sato, Fukuoka (JP); Hideo Okawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1160 days.

(21) Appl. No.: 12/360,863

(22) Filed: Jan. 28, 2009

(65) Prior Publication Data

US 2009/0193066 A1 Jul. 30, 2009

(30) Foreign Application Priority Data

Jan. 28, 2008 (JP) .................................. 2008-016725
Nov. 14, 2008 (JP) .................................. 2008-292812

(51) Int. Cl.
  *G06F 7/38* (2006.01)
  *G06F 7/44* (2006.01)
  *G06F 7/42* (2006.01)
  *G06F 7/52* (2006.01)
  *G06F 7/50* (2006.01)

(52) U.S. Cl.
  USPC ........... 708/653; 708/491; 708/504; 708/505; 708/518; 708/523; 708/650; 708/670; 708/671

(58) Field of Classification Search
  USPC ................. 708/491, 523, 650–656, 504–505, 708/518, 670–671; 375/240.26
  See application file for complete search history.

(56) References Cited

U.S. PATENT DOCUMENTS

| 4,722,069 A * | 1/1988 | Ikeda ............................ 708/656 |
| 4,949,294 A | 8/1990 | Wambergue |
| 5,910,910 A * | 6/1999 | Steele, Jr. ...................... 708/650 |
| 5,969,976 A * | 10/1999 | Kawasaki et al. ............. 708/655 |
| 6,138,138 A * | 10/2000 | Ogura ........................... 708/656 |
| 6,401,185 B1 * | 6/2002 | Sexton et al. ................. 711/209 |
| 6,477,557 B1 * | 11/2002 | Yano ............................. 708/655 |
| 7,197,526 B1 * | 3/2007 | Qu ................................ 708/491 |
| 7,839,936 B2 * | 11/2010 | Vacanti .................... 375/240.26 |
| 2001/0044719 A1 | 11/2001 | Casey |
| 2006/0136542 A1 * | 6/2006 | Natarajan et al. ............. 708/650 |
| 2008/0063366 A1 * | 3/2008 | Sako et al. ...................... 386/95 |
| 2008/0071850 A1 * | 3/2008 | Harrison et al. .............. 708/523 |

FOREIGN PATENT DOCUMENTS

| JP | 10-187037 A | 7/1998 |
| JP | 2002-014805 A | 1/2002 |
| JP | 2003-015864 A | 1/2003 |

* cited by examiner

*Primary Examiner* — Idriss N Alrobaye
*Assistant Examiner* — Henry Yu
(74) *Attorney, Agent, or Firm* — Fujitsu Patent Center

(57) ABSTRACT

A dividing unit sets an actual packet length transferred from a packet receiving section to a variable U, and then sets $2^\alpha$ to a variable V. If a positive number determining section determines that a subtraction result of subtracting a remainder $N_0$ from a quotient $M_0$, both found by dividing U by V, is a positive number, the dividing unit overwrites the subtraction result to U. The dividing unit repeats such operations of dividing the subtraction result by V, until the positive number determining section determines that the subtraction result of subtracting the remainder from the quotient, both found by dividing U by V, is a non-positive number. When the subtraction result becomes a non-positive number and the quotient and the remainder match, a packet length determining section determines that received data has a normal size, and notifies it to a discard determining section.

7 Claims, 13 Drawing Sheets

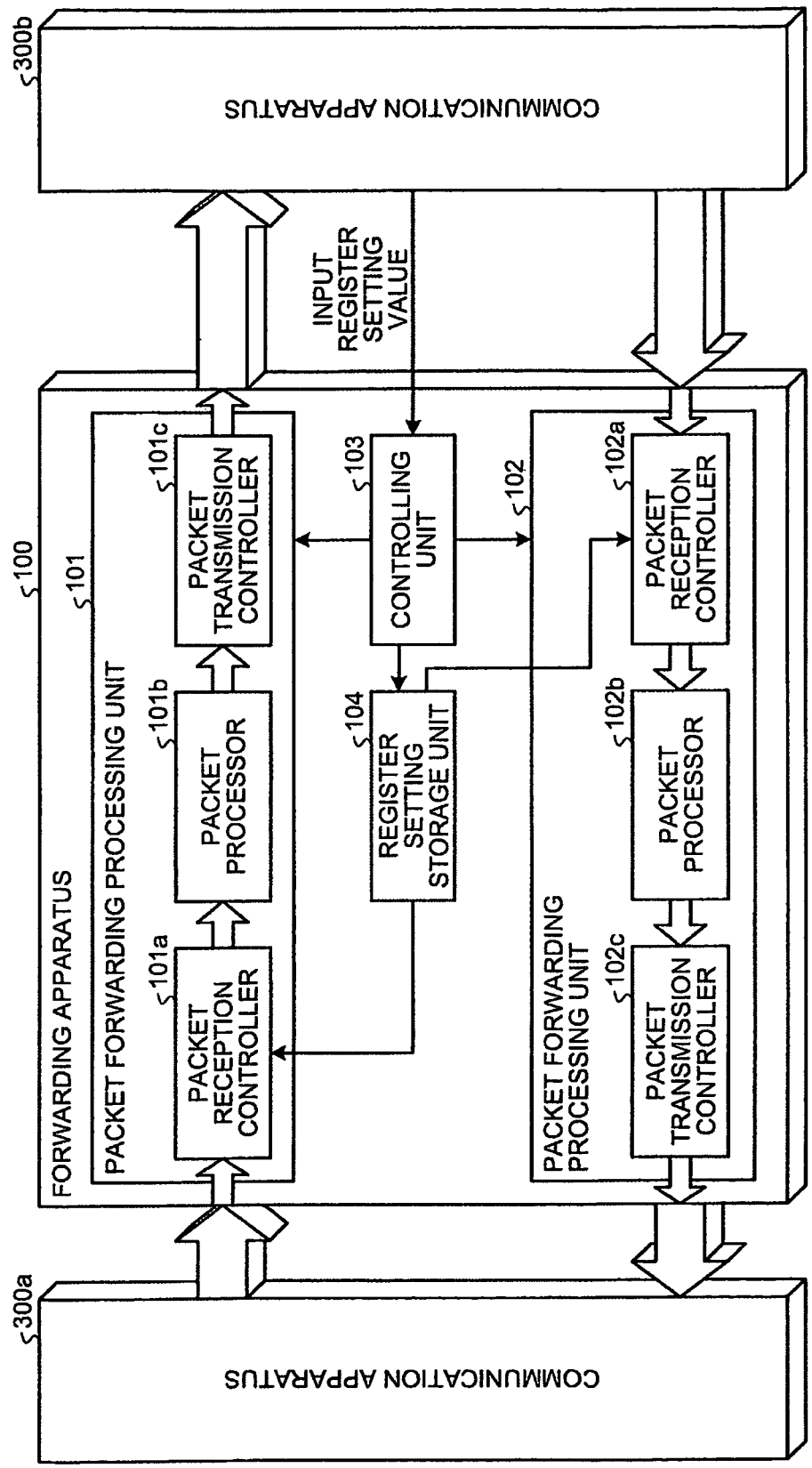

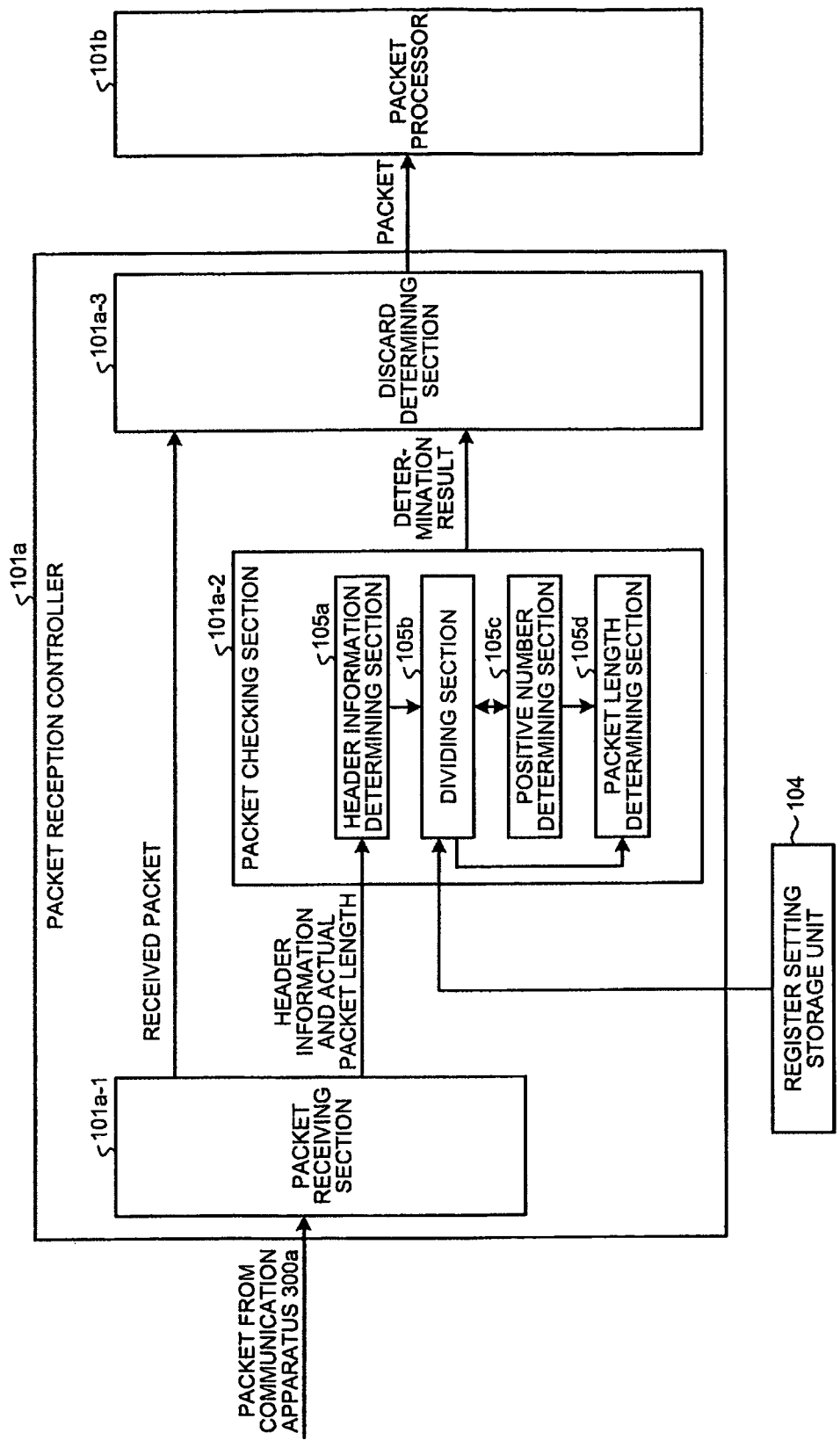

FIG.3A

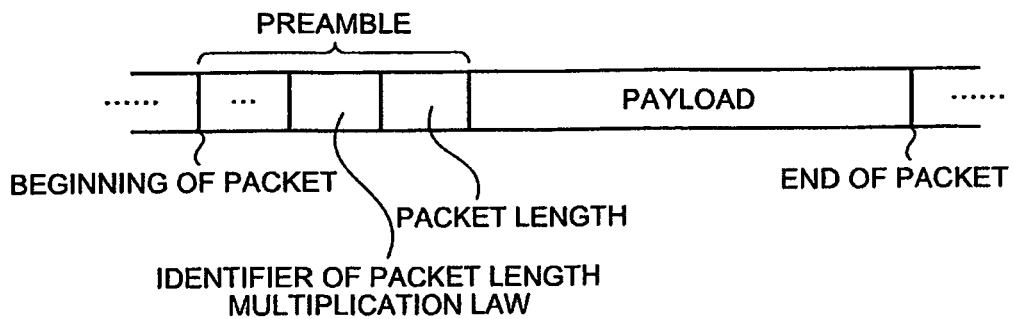

PREAMBLE

BEGINNING OF PACKET

IDENTIFIER OF PACKET LENGTH MULTIPLICATION LAW

PACKET LENGTH

PAYLOAD

END OF PACKET

FIG.3B

| IDENTIFIER OF PACKET LENGTH MULTIPLICATION LAW | PACKET LENGTH MULTIPLICATION LAW |
|---|---|
| 0 | MULTIPLE OF ((POWERS OF 2)+1) |
| 1 | MULTIPLE OF POWERS OF 2 |
| 2 | FIXED LENGTH |

FIG.4

| IDENTIFIER OF PACKET LENGTH MULTIPLICATION LAW | MULTIPLICATION LAW VALUE |
|---|---|
| 0 | $X=2^{\alpha}+1$ [Byte] |
| 1 | $Y=2^{\beta}$ [Byte] |
| 2 | $Z$ [Byte] |

FIG.7A

EXAMPLES OF DETERMINING WHETHER PACKET LENGTH IS MULTIPLE OF 5, USING 4 (POWERS OF 2) (PACKET LENGTH 0 TO 31 IS SHOWN BELOW)

| PACKET LENGTH | QUOTIENT (M) | REMAINDER (N) | PROCESS | | | QUOTIENT (M) | REMAINDER (N) | PROCESS | | | QUOTIENT (M) | REMAINDER (N) | PROCESS |
|---|---|---|---|---|---|---|---|---|---|---|---|---|---|
| 0÷4= | 0 | ···0 | M=N | COMPLETED |  | MULTIPLE OF 5 |  |  |  |  |  |  |  |
| 1÷4= | 0 | ···1 | M<N | COMPLETED |  | NOT MULTIPLE OF 5 |  |  |  |  |  |  |  |
| 2÷4= | 0 | ···2 | M<N | COMPLETED |  | NOT MULTIPLE OF 5 |  |  |  |  |  |  |  |
| 3÷4= | 0 | ···3 | M<N | COMPLETED |  |  |  |  |  |  |  |  |  |
| 4÷4= | 1 | ···0 | M>N | CONTINUED | M-N | =1÷4= | 0 | ···1 | M<N | COMPLETED | NOT MULTIPLE OF 5 |  |  |
| 5÷4= | 1 | ···1 | M=N | COMPLETED |  | MULTIPLE OF 5 |  |  |  |  |  |  |  |
| 6÷4= | 1 | ···2 | M<N | COMPLETED |  | NOT MULTIPLE OF 5 |  |  |  |  |  |  |  |
| 7÷4= | 1 | ···3 | M<N | COMPLETED |  |  |  |  |  |  |  |  |  |
| 8÷4= | 2 | ···0 | M>N | CONTINUED | M-N | =2÷4= | 0 | ···2 | M<N | COMPLETED | NOT MULTIPLE OF 5 |  |  |
| 9÷4= | 2 | ···1 | M>N | CONTINUED | M-N | =1÷4= | 0 | ···1 | M<N | COMPLETED |  |  |  |
| 10÷4= | 2 | ···2 | M=N | COMPLETED |  | MULTIPLE OF 5 |  |  |  |  |  |  |  |
| 11÷4= | 2 | ···3 | M<N | COMPLETED |  |  |  |  |  |  |  |  |  |
| 12÷4= | 3 | ···0 | M>N | CONTINUED | M-N | =3÷4= | 0 | ···3 | M<N | COMPLETED |  |  |  |
| 13÷4= | 3 | ···1 | M>N | CONTINUED | M-N | =2÷4= | 0 | ···2 | M<N | COMPLETED |  |  |  |
| 14÷4= | 3 | ···2 | M>N | CONTINUED | M-N | =1÷4= | 0 | ···1 | M<N | COMPLETED |  |  |  |
| 15÷4= | 3 | ···3 | M=N | COMPLETED |  | MULTIPLE OF 5 |  |  |  |  |  |  |  |
| 16÷4= | 4 | ···0 | M>N | CONTINUED | M-N | =4÷4= | 1 | ···0 | M>N | CONTINUED | M-N | =1÷4= 0 ···1 | M<N COMPLETED NOT MULTIPLE OF 5 |
| 17÷4= | 4 | ···1 | M>N | CONTINUED | M-N | =3÷4= | 0 | ···3 | M<N | COMPLETED |  |  |  |
| 18÷4= | 4 | ···2 | M>N | CONTINUED | M-N | =2÷4= | 0 | ···2 | M<N | COMPLETED |  |  |  |
| 19÷4= | 4 | ···3 | M>N | CONTINUED | M-N | =1÷4= | 0 | ···1 | M<N | COMPLETED |  |  |  |
| 20÷4= | 5 | ···0 | M>N | CONTINUED | M-N | =5÷4= | 1 | ···1 | M=N | COMPLETED | MULTIPLE OF 5 |  |  |
| 21÷4= | 5 | ···1 | M>N | CONTINUED | M-N | =4÷4= | 1 | ···0 | M>N | CONTINUED | M-N | =1÷4= 0 ···1 | M<N COMPLETED NOT MULTIPLE OF 5 |
| 22÷4= | 5 | ···2 | M>N | CONTINUED | M-N | =3÷4= | 0 | ···3 | M<N | COMPLETED |  |  |  |
| 23÷4= | 5 | ···3 | M>N | CONTINUED | M-N | =2÷4= | 0 | ···2 | M<N | COMPLETED |  |  |  |
| 24÷4= | 6 | ···0 | M>N | CONTINUED | M-N | =6÷4= | 1 | ···2 | M<N | COMPLETED | NOT MULTIPLE OF 5 |  |  |
| 25÷4= | 6 | ···1 | M>N | CONTINUED | M-N | =5÷4= | 1 | ···1 | M=N | COMPLETED | MULTIPLE OF 5 |  |  |
| 26÷4= | 6 | ···2 | M>N | CONTINUED | M-N | =4÷4= | 1 | ···0 | M>N | CONTINUED | M-N | =1÷4= 0 ···1 | M<N COMPLETED NOT MULTIPLE OF 5 |
| 27÷4= | 6 | ···3 | M>N | CONTINUED | M-N | =3÷4= | 0 | ···3 | M<N | COMPLETED |  |  |  |
| 28÷4= | 7 | ···0 | M>N | CONTINUED | M-N | =7÷4= | 1 | ···3 | M<N | COMPLETED |  |  |  |
| 29÷4= | 7 | ···1 | M>N | CONTINUED | M-N | =6÷4= | 1 | ···2 | M<N | COMPLETED | NOT MULTIPLE OF 5 |  |  |
| 30÷4= | 7 | ···2 | M>N | CONTINUED | M-N | =5÷4= | 1 | ···1 | M=N | COMPLETED | MULTIPLE OF 5 |  |  |
| 31÷4= | 7 | ···3 | M>N | CONTINUED | M-N | =4÷4= | 1 | ···0 | M>N | CONTINUED | M-N | =1÷4= 0 ···1 | M<N COMPLETED |

FIG.7B

EXAMPLES OF DETERMINING WHETHER PACKET LENGTH IS MULTIPLE OF 9, USING 8 (POWERS OF 2) (PACKET LENGTH 0 TO 31 IS SHOWN BELOW)

| PACKET LENGTH | QUOTIENT (M) | REMAINDER (N) | PROCESS | | |
|---|---|---|---|---|---|
| 0÷8= | 0 | ...0 | COMPLETED | M=N | MULTIPLE OF 9 |
| 1÷8= | 0 | ...1 | COMPLETED | M<N | NOT MULTIPLE OF 9 |
| 2÷8= | 0 | ...2 | COMPLETED | M<N | NOT MULTIPLE OF 9 |
| 3÷8= | 0 | ...3 | COMPLETED | M<N | NOT MULTIPLE OF 9 |
| 4÷8= | 0 | ...4 | COMPLETED | M<N | NOT MULTIPLE OF 9 |
| 5÷8= | 0 | ...5 | COMPLETED | M<N | NOT MULTIPLE OF 9 |
| 6÷8= | 0 | ...6 | COMPLETED | M<N | NOT MULTIPLE OF 9 |
| 7÷8= | 0 | ...7 | COMPLETED | M<N | NOT MULTIPLE OF 9 |
| 8÷8= | 1 | ...0 | CONTINUED | M>N | M-N |
| 9÷8= | 1 | ...1 | COMPLETED | M=N | MULTIPLE OF 9 |
| 10÷8= | 1 | ...2 | COMPLETED | M<N | NOT MULTIPLE OF 9 |
| 11÷8= | 1 | ...3 | COMPLETED | M<N | NOT MULTIPLE OF 9 |
| 12÷8= | 1 | ...4 | COMPLETED | M<N | NOT MULTIPLE OF 9 |
| 13÷8= | 1 | ...5 | COMPLETED | M<N | NOT MULTIPLE OF 9 |
| 14÷8= | 1 | ...6 | COMPLETED | M<N | NOT MULTIPLE OF 9 |
| 15÷8= | 1 | ...7 | COMPLETED | M<N | NOT MULTIPLE OF 9 |
| 16÷8= | 2 | ...0 | CONTINUED | M>N | M-N |
| 17÷8= | 2 | ...1 | CONTINUED | M>N | M-N |
| 18÷8= | 2 | ...2 | COMPLETED | M=N | MULTIPLE OF 9 |
| 19÷8= | 2 | ...3 | COMPLETED | M<N | NOT MULTIPLE OF 9 |
| 20÷8= | 2 | ...4 | COMPLETED | M<N | NOT MULTIPLE OF 9 |
| 21÷8= | 2 | ...5 | COMPLETED | M<N | NOT MULTIPLE OF 9 |
| 22÷8= | 2 | ...6 | COMPLETED | M<N | NOT MULTIPLE OF 9 |
| 23÷8= | 2 | ...7 | COMPLETED | M<N | NOT MULTIPLE OF 9 |
| 24÷8= | 3 | ...0 | CONTINUED | M>N | M-N |
| 25÷8= | 3 | ...1 | CONTINUED | M>N | M-N |
| 26÷8= | 3 | ...2 | CONTINUED | M>N | M-N |
| 27÷8= | 3 | ...3 | COMPLETED | M=N | MULTIPLE OF 9 |
| 28÷8= | 3 | ...4 | COMPLETED | M<N | NOT MULTIPLE OF 9 |
| 29÷8= | 3 | ...5 | COMPLETED | M<N | NOT MULTIPLE OF 9 |
| 30÷8= | 3 | ...6 | COMPLETED | M<N | NOT MULTIPLE OF 9 |
| 31÷8= | 3 | ...7 | COMPLETED | M<N | NOT MULTIPLE OF 9 |

=1÷8= QUOTIENT (M) 0 REMAINDER (N) ...1 PROCESS M<N COMPLETED — NOT MULTIPLE OF 9

=2÷8= 0 ...2 M<N COMPLETED
=1÷8= 0 ...1 M<N COMPLETED — NOT MULTIPLE OF 9

=3÷8= 0 ...3 M<N COMPLETED
=2÷8= 0 ...2 M<N COMPLETED
=1÷8= 0 ...1 M<N COMPLETED — NOT MULTIPLE OF 9

FIG.10

| IDENTIFIER OF PACKET LENGTH MULTIPLICATION LAW | PACKET LENGTH MULTIPLICATION LAW |
|---|---|
| 0 | MULTIPLE OF $(2^\alpha + 2^\beta)$ $(\alpha > \beta \geq 0)$ |
| 1 | MULTIPLE OF $2^\gamma$ $(\gamma > 0)$ |
| 2 | FIXED LENGTH |

FIG.11

| IDENTIFIER OF PACKET LENGTH MULTIPLICATION LAW | MULTIPLICATION LAW VALUE |
|---|---|
| 0 | $X = 2^\alpha + 2^\beta$ $(\alpha > \beta \geq 0)$ [Byte] |
| 1 | $Y = 2^\gamma$ $(\gamma > 0)$ [Byte] |
| 2 | Z [Byte] |

COMMUNICATION APPARATUS, METHOD OF CHECKING RECEIVED DATA SIZE, MULTIPLE DETERMINING CIRCUIT, AND MULTIPLE DETERMINATION METHOD

CROSS-REFERENCE TO RELATED APPLICATION(S)

This application is based upon and claims the benefit of priority of the prior Japanese Patent Application No. 2008-016725, filed on Jan. 28, 2008; and Japanese Patent Application No. 2008-292812, filed on Nov. 14, 2008, the entire contents of which are incorporated herein by reference.

FIELD

The embodiments discussed herein are directed to a communication apparatus that determines whether the size of data received from another communication apparatus is a multiple of a predetermined integer, so as to determine whether the received data has a normal size, a method of checking a received data size, and a multiple determining circuit and a multiple determination method that determine whether a fist integer is a multiple of a second integer.

BACKGROUND

Conventionally, apparatuses that transmit and receive data in wireless communication networks for mobile phones, or apparatuses that transmit and receive data such as internet protocol (IP) packets in computer networks determine whether a packet length is a multiple of a certain number, so as to confirm that the received data is normal. In this way, the apparatuses check the packet length of a fixed-length or variable-length packet.

In such wireless communication networks for mobile phones and computer networks, a maximum real-time processing is required for communication. Thus, it is critical how to check the packet length at high speed.

For example, Japanese Laid-open Patent Publication Nos. 2002-14805 and 2003-15864 disclose multiple determining circuits that determine whether a given operand represented by binary digits is an integral multiple of an operation value represented by $2^n-1$ (n is a natural number. In the latter publication, the operand is 5). Such multiple determining circuits divide the operand into n-bit units, sum up them, and use a sum value as a new operand. The multiple determining circuits then repeat such dividing and summing until a bit array corresponding to the sum value becomes equal to or less than a predetermined bit number, and determine whether the bit array for the sum value being equal to or less than the predetermined bit number for the first time is contained in integer multiples of an operation value stored in advance. In this way, it is determined whether the given operand is the operation value.

Japanese Laid-open Patent Publication No. 10-187037 proposes a prime number determination method that determines the primality of an element belonging to a group C, made up of integers B being different from an integer A or integers being different from an integer A by a multiple of an integer B. Calculation is performed using the integer B or a multiple of the integer B as a dividend and one or more integers as a divisor or a group of divisors, and a remainder or a group of remainders are stored. From the group of remainders thus stored, a remainder corresponding to an element of the group C is used, and calculation is performed using the element of the group C as a dividend and one or more integers as a divisor(s), and a remainder(s) are found. In this way, the primality of the element belonging to the group C is determined. By applying this method, whether the element of the group C is a prime number or a composite number is found, and whether the element of the group C is a multiple of a certain number is determined.

U.S. Pat. No. 4,949,294 discloses a method including finding a remainder from composite numbers with a modulus of $m^i=4K+3$ (k is an integer satisfying k>0), assigning indices for each composite number and its remainder, respectively, and storing the indices. A remainder found from a multiple of two composite numbers is a sum of remainders that are found by performing the above-described calculation with the respective composite numbers. Thus, it is possible to find composite numbers corresponding to a sum of such remainders by using a relationship between indices stored in advance. In this way, complex multiplication can be performed at high speed. By applying this method, whether an integer A is a multiple of an integer B is determined by trying and finding an integer $\alpha$ satisfying $A=\alpha B$.

Conventional technologies typically seen in Japanese Laid-open Patent Publication Nos. 2002-14805 and 2003-15864 impose a processing load due to repetitive processes including dividing the operand into n-bit units and summing up obtained values until a sum value becomes equal to or less than a predetermined bit number. In addition, information needs to be prepared in advance as a reference for determining whether a sum value, found by dividing the operand into n-bit units and summing up obtained values, is a multiple of the operation value when the sum value becomes equal to or less than a predetermined bit number for the first time.

In a conventional technology typically seen in Japanese Laid-open Patent Publication No. 10-187037, it is required to calculate and store in advance a remainder or a group of remainders that are found when one or more integers are used as a divisor or a group of divisors. Further, this technology places the focus on generating a prime number that is hardly found the primality, and does not concern quick processing for finding a remainder(s) produced by the division of an element belonging to the group C (dividend) by one or more integers (divisor), by using the element corresponding to one of the residues in the stored group.

In a conventional technology typically seen in U.S. Pat. No. 4,949,294, whether an integer A is a multiple of an integer B is determined by trying and finding $\alpha$ satisfying $A=\alpha B$. This may require enormous processing time for determining whether the integer A is a multiple of the integer B.

SUMMARY

According to an aspect of the invention, a communication apparatus determines whether received data from another communication apparatus has a size being a multiple of an integer number represented by $(2^\alpha+2^\beta)$ where $\alpha$ and $\beta$ are natural numbers and $\alpha>\beta\geq0$, to determine whether the received data has a normal size. The communication apparatus includes a dividend setting unit that sets a value as a dividend; a first divisor setting unit that sets, as a divisor, $2^\beta(2^{\alpha-\beta}+1)$ transformed from $(2^\alpha+2^\beta)$; a remainder determining unit that determines whether a remainder found by dividing the dividend by $2^\beta$ which is a factor of $2^\beta(2^{\alpha-\beta}+1)$ is 0; a second divisor setting unit that sets, as the divisor, $2^{\alpha-\beta}$ found by subtracting 1 from $(2^{\alpha-\beta}+1)$ which is a factor of $2^\beta(2^{\alpha-\beta}+1)$ when the remainder determining unit determines that the remainder found by dividing the dividend by $2^\beta$ is 0; a dividing unit that divides the dividend by the divisor to find a quotient and a remainder when the second divisor setting unit sets $2^{\alpha-\beta}$ as the dividend; a positive number determining unit that determines whether a subtraction result of subtracting the remainder from the quotient, both found by the dividing unit, is a positive number; a matching determining unit that determines, when the positive number determining unit determines that the subtraction result is a non-positive number, whether the quotient and the remainder both found by the dividing unit match; and a data size determining unit that determines, when the matching determining unit finds a match between the quotient and the remainder, that the received data has a normal size, and determines, when the matching determining unit finds no match between the quotient and the remainder, that the received data has an abnormal size. The remainder determining unit, when not determining that the remainder found by dividing the dividend by $2^{\beta}$ is 0, determines that the received data does has an abnormal size. The dividend setting unit sets the size of the received data as an initial value for the dividend, and sets the subtraction result to the dividend when the positive number determining unit determines that the subtraction result is a positive number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a schematic functional block diagram of a forwarding apparatus according to a first embodiment of the present invention;

FIG. 2 is a schematic functional block diagram of a packet reception controller of the forwarding apparatus depicted in FIG. 1;

FIG. 3A depicts an example of a packet data format;

FIG. 3B depicts examples of an identifier of a packet length multiplication law;

FIG. 4 depicts an example of a register setting storage table;

FIG. 7A depicts operation examples of checking a multiple of 5 by a divisor 4;

FIG. 7B depicts operation examples of checking a multiple of 9 by a divisor 8;

FIG. 10 depicts examples of an identifier of a packet length multiplication law according to a third embodiment of the present invention;

FIG. 11 depicts an example of a register setting storage table according to the third embodiment;

DESCRIPTION OF EMBODIMENT(S)

Figure 5:
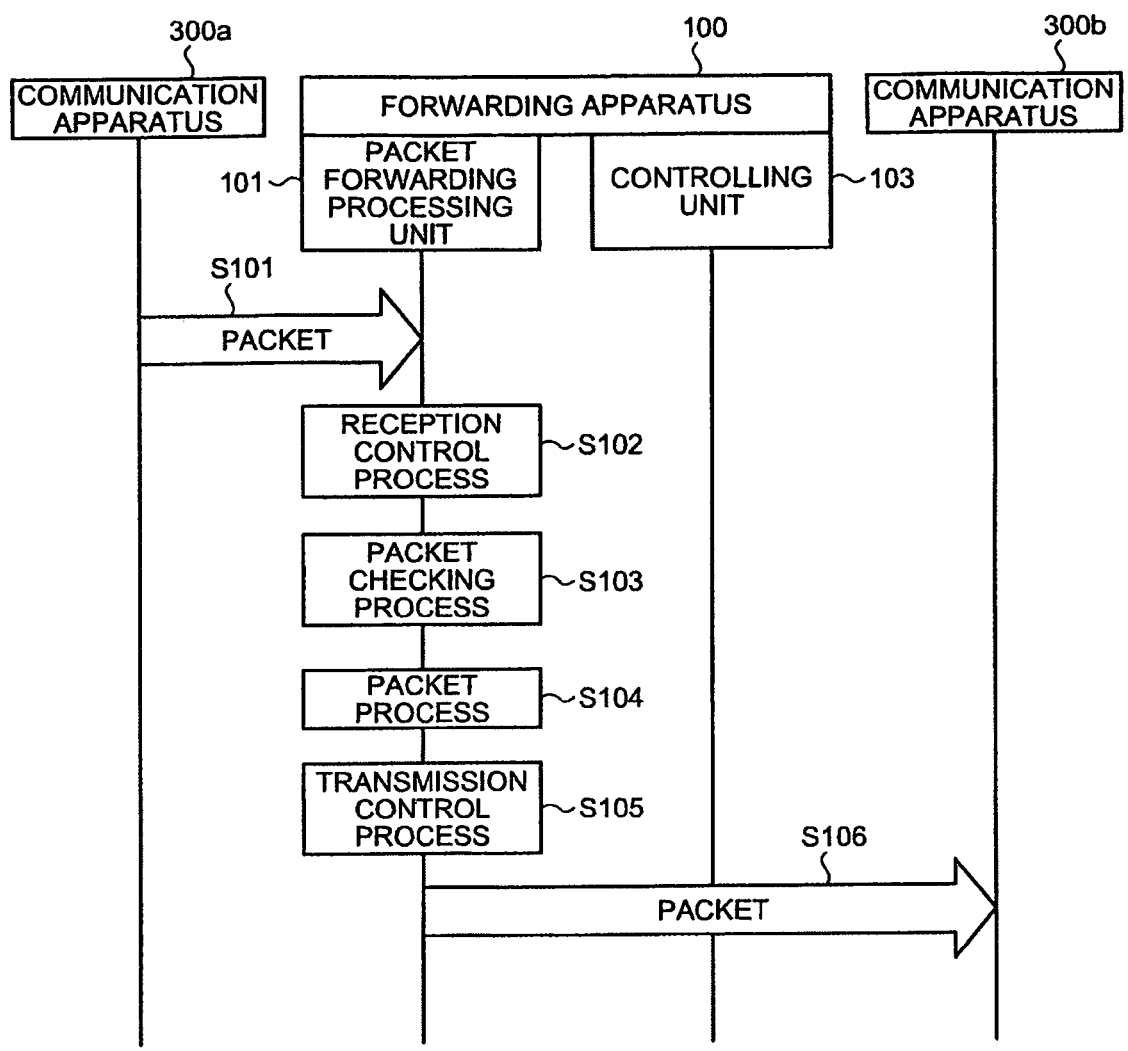
FIG. 5 is a sequence diagram of a communication forwarding process according to the first embodiment.

Preferred embodiments of the present invention will be explained with reference to accompanying drawings. In the following embodiments, a communication apparatus according to the present invention is applied to a forwarding apparatus. Specifically, the forwarding apparatus is a wireless base station that wirelessly forwards communication data from a mobile telephone or the like to other mobile telephones. The present invention is not limited to this, and may be widely applied to a forwarding apparatus that forwards communication data between communication apparatuses via wired or wireless communications.

The present invention may be widely applied not only to a forwarding apparatus, but also to a communication apparatus that transmits and receives communication data to and from another communication apparatus via wired or wireless communications. For example, the present invention may be applied to a computer apparatus that transmits and receives communication data to and from another computer apparatus via wired or wireless communications, or to a communication apparatus that transmits and receives communication data to and from another communication apparatus via wired or wireless communications.

In the following embodiments, a data format of communication data is a packet, and a received data size is a packet length. The data format of the communication data is not limited to this, and may be various data formats depending on communication methods. Although the embodiments use byte(s) as a unit representing a data amount, any unit representing an information amount may be used.

[a] First Embodiment

The following describes a configuration of a forwarding apparatus according to a first embodiment of the present invention. FIG. 1 is a schematic block diagram of a forwarding apparatus according to the first embodiment. As depicted in FIG. 1, a forwarding apparatus 100 according to the first embodiment forwards a packet to be transmitted and received between communication apparatuses 300a and 300b that face each other.

The forwarding apparatus 100 includes a packet forwarding processing units 101 and 102, a controlling unit 103, and a register setting storage unit 104. The packet forwarding processing unit 101 forwards a packet received from the communication apparatus 300a and transmits it to the communication apparatus 300b. Concurrently, the packet forwarding processing unit 102 forwards a packet received from the communication apparatus 300b and transmits it to the communication apparatus 300a.

The packet forwarding processing unit 101 includes a packet reception controller 101a, a packet processor 101b, and a packet transmission controller 101c. The packet reception controller 101a receives a packet from the communication apparatus 300a, and checks a packet length of the received packet. As a result, if the received packet has a normal length, the packet reception controller 101a transfers the received packet to the packet processor 101b. On the contrary, if "the received packet has an abnormal length", the packet reception controller 101a discards the received packet.

The packet processor 101b performs protocol control and transfer control according to the packet received from the packet reception controller 101a, and then transfers the received packet to the packet transmission controller 101c.

The packet transmission controller 101c transmits, as a transmission packet, the packet received from the packet processor 101b to the communication apparatus 300b. The packet forwarding processing unit 102 has the same configuration and functions and performs the same process as the packet forwarding processing unit 101. Thus, descriptions thereof are omitted.

The controlling unit 103 performs overall control of the forwarding apparatus 100. The controlling unit 103 controls the forwarding apparatus 100 by implementing firmware necessary for controlling the forwarding apparatus 100. The controlling unit 103 stores an externally input register setting value in a register setting storage table (described later) stored in the register setting storage unit 104.

The register setting value to be stored in the register setting storage table is variable depending on an external input. Because a register setting value stored in the register setting storage table is variable, a packet length multiplication law is handled flexibly, and whether a packet has a normal length can be determined as to packets following various packet length multiplication laws.

The following describes a configuration of a packet reception controller of the forwarding apparatus according to the first embodiment depicted in FIG. 1. FIG. 2 is a schematic block diagram of the packet reception controller of the forwarding apparatus according to the first embodiment. The packet reception controller 101a of the forwarding apparatus 100 according to the first embodiment includes a packet receiving section 101a-1, a packet checking section 101a-2, and a discard determining section 101a-3.

The packet receiving section 101a-1 transfers the received packet to the discard determining section 101a-3. At the same time, the packet receiving section 101a-1 obtains an identifier of a packet length multiplication law (described later) and a packet length from header information of the received packet, and transfers them to the packet checking section 101a-2. Further, the packet receiving section 101a-1 measures an actual packet length of the received packet, and transfers it to the packet checking section 101a-2 as an actual packet length.

The packet checking section 101a-2 includes a header information determining section 105a, a dividing section 105b, a positive number determining section 105c, and a packet length determining section 105d. Based on the identifier of the packet length multiplication law thus transferred from the packet receiving section 101a-1, the header information determining section 105a determines whether the received packet has a packet length following a multiplication law of [(powers of 2)+1], a packet length following a multiplication law of powers of 2, or a fixed length.

As depicted in FIG. 3A, for example, a packet format includes: a preamble including at least fields of a packet length identifier and a packet length; and a payload where user data is stored.

As depicted in FIG. 3B, for example, identifiers for corresponding packet length multiplication laws are indicated as "0" for "a multiple of ((powers of 2)+1)", "1" for "a multiple of powers of 2", and "2" for "a fixed length".

The dividing section 105b stores in a work memory a dividend and a divisor as a variable U and a variable V, respectively. The dividing section 105b sets an actual packet length of a packet transferred from the packet receiving section 101a-1 to U.

If the identifier of the packet length multiplication law is "0", the dividing section 105b reads out a setting value, $X=2^{\alpha}+1$ ($\alpha$ is a natural number) from the register setting storage table stored in the register setting storage unit 104 as depicted in FIG. 4, for example, and sets $X-1=2^{\alpha}$ (a value found by subtracting 1 from X) to V.

U is divided by V, and a quotient $M_0$ and a remainder $N_0$ are found. If the positive number determining section 105c determines that a result of subtracting $N_0$ from $M_0$, i.e., $(M_0-N_0)$, is a positive number $(M_0-N_0>0)$, the dividing section 105b overwrites the subtraction result $(M_0-N_0)$ to U.

The dividing section 105b then divides U by V, and a quotient $M_1$ and a remainder $N_1$ are found. The positive number determining section 105c determines whether a result of subtracting $N_1$ from $M_1$, i.e., $(M_1-N_1)$, is a positive number. If the subtraction result $(M_1-N_1)$ is a positive number $(M_1-N_1>0)$, the dividing section 105b overwrites the subtraction result $(M_1-N_1)$ to U.

Until the positive number determining section 105c determines that the result of subtracting the remainder from the quotient (both found by dividing U by V) becomes a non-positive number, the dividing section 105b repeats the above-described operation of dividing the subtraction result by V.

The packet length determining section 105d determines whether there is a match between the quotient and the remainder that are found when the subtraction result becomes a non-positive number. If there is a match, the packet length determining section 105d determines that the received data has a normal size. If not, the packet length determining section 105d determines that the received data has an abnormal size, and notifies the determination result to the discard determining section 101a-3.

If the identifier of the packet length multiplication law is 1, the dividing section 105b reads out a setting value, "$Y=2^{\beta}$" ($\beta$ is a natural number) from the register setting storage table, and sets $Y=2^{\alpha}$ to V. The dividing section 105b then divides U by V.

The packet length determining section 105d determines whether a remainder found as the division result is 0. If the remainder is 0, the packet length determining section 105d determines that the received data has a normal size. If not, the packet length determining section 105d determines that the received data has an abnormal size, and notifies the determination result to the discard determining section 101a-3.

If the identifier of the packet length multiplication law is 2, the dividing section 105b reads out a setting value Z (Z is an integer) from the register setting storage table, and sets Z to V. The packet length determining section 105d determines whether there is a match between U and V. If there is a match, the packet length determining section 105d determines that the received data has a normal size. If not, the packet length determining section 105d determines that the received data has an abnormal size, and notifies the determination result to the discard determining section 101a-3.

If the determination result notified from the packet length determining section 105d is that the received data has a normal size, the discard determining section 101a-3 transfers the packet received from the packet receiving section 101a-1 to the packet processor 101b. If the determination result is that the received data has an abnormal size, the discard determining section 101a-3 discards the packet received from the packet receiving section 101a-1.

The packet forwarding processing unit 101, the packet reception controller 101a, the packet processor 101b, the packet transmission controller 101c, the packet forwarding processing unit 102, the packet reception controller 102a, a packet processor 102b, and a packet transmission controller 102c are implemented by hardware as dedicated integrated circuits or wired logic. This enables high-speed processing.

Specifically, the packet checking section 101a-2 of the packet reception controller 101a is implemented as a dedicated integrated circuit or wired logic. This enables high-speed packet checking, achieving improved processing performance of the forwarding apparatus 100.

The following describes a communication forwarding process according to the first embodiment. FIG. 5 is a sequence diagram of a communication forwarding process according to the first embodiment. As depicted in FIG. 5, a packet is transmitted from the communication apparatus 300a to the packet forwarding processing unit 101 of the forwarding apparatus 100 (Step S101).

Upon receiving a packet from the communication apparatus 300a, the packet reception controller 101a of the packet forwarding processing unit 101 performs reception control on the received packet (Step S102). Then, the packet checking section 101a-2 of the packet reception controller 101a checks the received packet (Step S103).

The packet processor 101b of the packet forwarding processing unit 101 processes the received packet (Step S104). The packet transmission controller 101c of the packet forwarding processing unit 101 controls to transmit the received packet as a transmission packet to the communication apparatus 300b (Step S105).

Accordingly, the packet is transmitted from the forwarding apparatus 100 to the communication apparatus 300b (Step S106).

Figure 6:
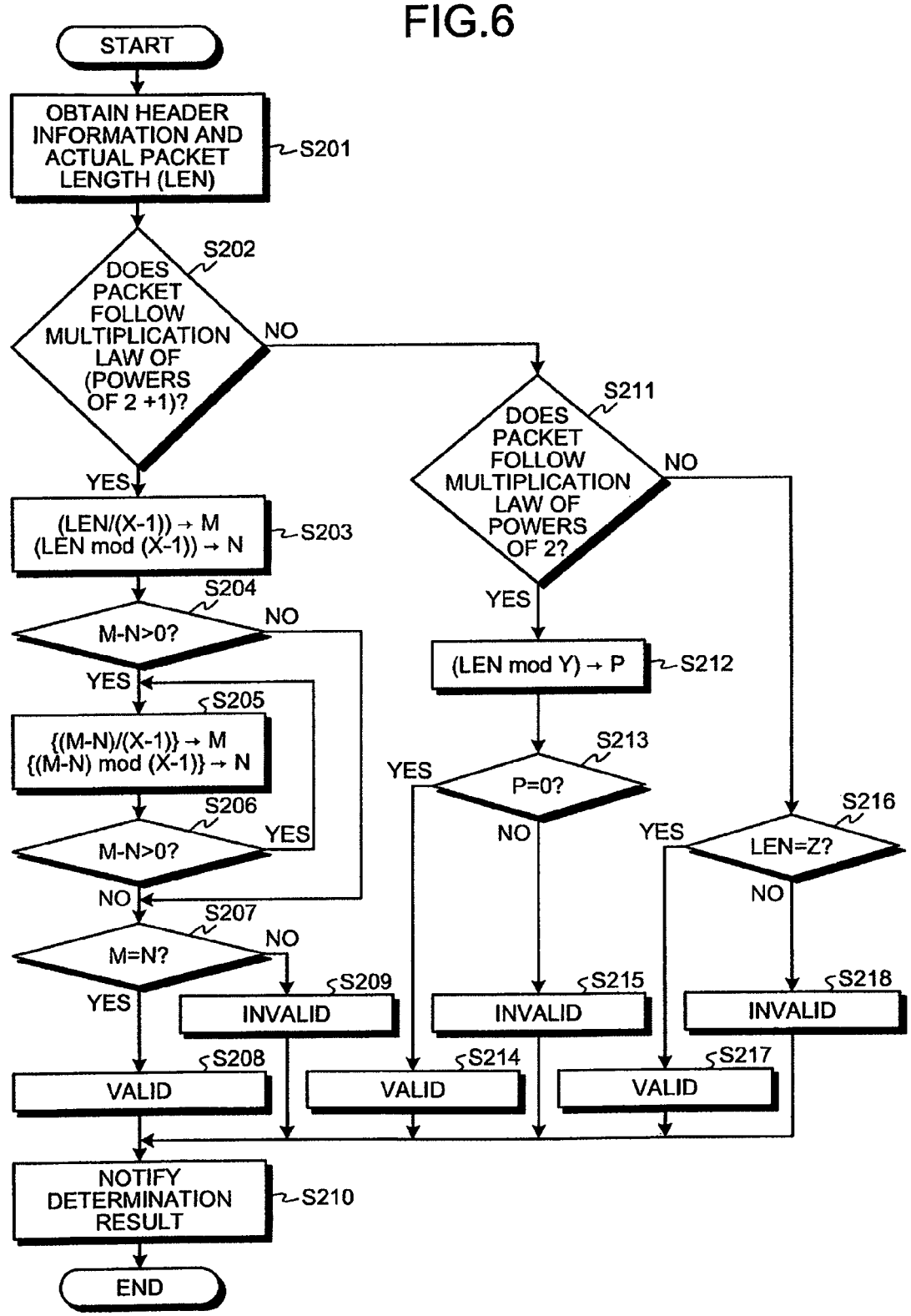
FIG. 6 is a flowchart of a packet checking process according to the first embodiment.

The following describes a packet checking process according to the first embodiment. FIG. 6 is a flowchart of a packet checking process according to the first embodiment. As depicted in FIG. 6, the header information determining section 105a obtains header information of the received packet (an identifier of a packet length multiplication law and a packet length) and an actual packet length (hereinafter, "LEN") from the packet receiving section 101a-1 (Step S201).

The header information determining section 105a determines whether the identifier of the packet length multiplication law is 0 (a packet following a multiplication law of [(powers of 2)+1]) (Step S202). If the identifier of the packet length multiplication law is 0 (YES at Step S202), the system control goes to Step S203. If not (NO at Step S202), the system control goes to Step S211.

At Step S203, the dividing section 105b sets LEN and X−1 (X is a prime number represented by (powers of 2)+1 depicted in FIG. 4) respectively to the variables U (dividend) and V (divisor) to be stored in the work memory, and divides U by V. Further, the dividing section 105b sets a quotient and a remainder found as the division result respectively to the variables M and N to be stored in the work memory. The remainder is calculated by mod operation.

The positive number determining section 105c determines whether M−N is greater than 0 (i.e., M−N is a positive number) (Step S204). If M−N is greater than 0 (YES at Step S204), the system control goes to Step S205. If not (NO at Step S204), the system control goes to Step S207.

At Step S205, the dividing section 105b overwrites M−N to U and divides U by V. The dividing section 105b then sets a quotient and a remainder found as the division result respectively to the variables M and N to be stored in the work memory.

The positive number determining section 105c determines whether M−N is greater than 0 (Step S206). If M−N is greater than 0 (YES at Step S206), the system control goes to Step S205. If not (NO at Step S206), the system control goes to Step S207.

At Step S207, the packet length determining section 105d determines whether M equals N (M=N). If M=N (YES at Step S207), the system control goes to Step S208. If not (NO at Step S207), the system control goes to Step S209.

At Step S208, the packet length determining section 105d sets a determination result Valid (the received data has a normal size (a multiple of [(powers of 2)+1])). On the contrary, at Step S209, the packet length determining section 105d sets a determination result Invalid (the received data has an abnormal size (not a multiple of [(powers of 2)+1])).

At Step S210, the packet length determining section 105d notifies the determination result to the discard determining section 101a-3.

At Step S211, the header information determining section 105a determines whether the identifier of the packet length multiplication law is 1 (a packet following a multiplication law of powers of 2). If the identifier of the packet length multiplication law is 1 (YES at Step S211), the system control goes to Step S212. If not (NO at Step S211), the system control goes to Step S216.

At Step S212, the dividing section 105b sets LEN and Y (Y is an integer represented by powers of 2 depicted in FIG. 4) respectively to the variables U (dividend) and V (divisor) to be stored in the work memory, and calculates a remainder of dividing U by V by remainder operation (mod operation). The dividing section 105b then sets the remainder resulting from the remainder operation to a variable P to be stored in the work memory.

The packet length determining section 105d determines whether P equals 0 (P=0) (Step S213). If P=0 (YES at Step S213), the system control goes to Step S214. If not (NO at Step S213), the system control goes to Step S215.

At Step S214, the packet length determining section 105d sets a determination result Valid (the received data has a normal size (a multiple of powers of 2)). On the contrary, at Step S215, the packet length determining section 105d sets a determination result Invalid (the received data has an abnormal size (not a multiple of powers of 2)). Upon completion of the process, the system control goes to Step S210.

At Step S216, the packet length determining section 105d determines whether LEN equals Z (LEN=Z) (Z is an integer of a fixed packet length depicted in FIG. 4). If LEN=Z (YES at Step S216), the system control goes to Step S217. If not (NO at Step S216), the system control goes to Step S218.

At Step S217, the packet length determining section 105d sets a determination result Valid (the received data has a normal size (being equal to a value of the fixed packet length stored in advance in the register setting storage unit 104)). On the contrary, at Step S218, the packet length determining section 105d sets a determination result Invalid (the received data has an abnormal size (being not equal to a value of the fixed packet length stored in advance in the register setting storage unit 104)). Upon completion of the process, the system control goes to Step S210.

As depicted at Steps S202 and S211, the process is branched depending on the value of the identifier of the packet length multiplication law. This enables to efficiently determine whether the received data has a normal size.

The following describes specific examples of the packet checking process depicted in FIG. 6. FIG. 7A depicts operation examples of checking whether a packet length is a multiple of 5, using a divisor 4. FIG. 7B depicts operation examples of checking whether a packet length is a multiple of 9, using a divisor 8.

Referring to FIG. 7A, whether the packet length ranging 0 to 31 bytes is a multiple of 5 ($=2^2+1$) is determined using 4 ($2^2$) that is powers of 2. Assume that the packet length is any one of 4, 8, 9, 12 to 14, and 16 to 31 bytes. Comparison is made between a quotient $M_1$ and a remainder $N_1$ that are found by dividing each of the packet lengths by 4 (a first division). Because $M_1 > N_1$ (i.e., $M_1 - N_1 > 0$) is found, $M_1 - N_1$ is divided by 4 (a second division).

A quotient $M_2$ and a remainder $N_2$ resulting from the second division are compared. When the packet length is any one of 16, 21, 26, and 31, $M_2 > N_2$ (i.e., $M_2 - N_2 > 0$) is found. Thus, $M_2 - N_2$ is divided by 4 (a third division). A quotient $M_3$ and a remainder $N_3$ resulting from the third division are compared, and $M_3 < N_3$ (i.e., $M_3 - N_3 < 0$) is found with any of the packet lengths. Thus, the packet checking process is terminated. Because $M_3 \neq N_3$ is found with any of the packet lengths, it is determined that none of 16, 21, 26, and 31 is a multiple of 5.

When the packet length is any one of 4, 8, 9, 12 to 14, 17 to 19, 22 to 24, and 27 to 29, $M_2 < N_2$ (i.e., $M_2 - N_2 < 0$) is found in the second division. Thus, the packet checking process is terminated. Because $M_2 \neq N_2$ is found with any of the packet lengths, it is determined that none of 4, 8, 9, 12 to 14, 17 to 19, 22 to 24, and 27 to 29 is a multiple of 5.

When the packet length is any one of 20, 25, and 30, $M_2 = M_2$ is found in the second division. Thus, the packet checking process is terminated, and it is determined that any of 20, 25, and 30 is a multiple of 5.

When the packet length is any one of 1 to 3, 6, 7, and 11, $M_1 < N_1$ (i.e., $M_1 - N_1 < 0$) is found in the first division. Thus, the packet checking process is terminated. Because $M_1 \neq N_1$ is found with any of the packet lengths, it is determined that none of 1 to 3, 6, 7, and 11 is a multiple of 5.

When the packet length is any one of 0, 5, 10, and 15, $M_1 = N_1$ is found in the first division. Thus, the packet checking process is terminated, and it is determined that any of 0, 5, 10, and 15 is a multiple of 5.

Similarly, referring to FIG. 7B, whether the packet length ranging 0 to 31 bytes is a multiple of 9 ($=2^3+1$) is determined using 8 ($2^3$) that is powers of 2. Assume that the packet length is any one of 8, 16, 17, and 24 to 26 bytes. Comparison is made between a quotient $M_1$ and a remainder $N_1$ that are found by dividing each of the packet lengths by 8 (a first division). Because $M_1 > N_1$ (i.e., $M_1 - N_1 > 0$) is found, $M_1 - N_1$ is divided by 8 (a second division).

A quotient $M_2$ and a remainder $N_2$ resulting from the division are compared, and $M_2 < N_2$ (i.e., $M_2 - N_2 < 0$) is found. Thus, the packet checking is terminated. Because $M_3 \neq N_3$ is found with any of the packet lengths, it is determined that none of 8, 16, 17, and 24 to 26 is a multiple of 9.

When the packet length is any one of 1 to 8, 10 to 15, 19 to 23, and 28 to 31, $M_1 < N_1$ (i.e., $M_1 - N_1 < 0$) is found in the first division. Thus, the packet checking process is terminated. Because $M_1 \neq N_1$ is found with any of the packet lengths, it is determined that none of 1 to 8, 10 to 15, 19 to 23, and 28 to 31 is a multiple of 9.

When the packet length is any one of 0, 9, 18, and 27, $M_1 = N_1$ is found in the first division. Thus, the packet checking process is terminated, and it is determined that any of 0, 9, 18, and 27 is a multiple of 9.

The validity of the above-described packet checking process (multiple determination process) is now considered. Equation 1 is given:

$$\frac{LEN}{2^\alpha} = 2^\alpha M_1 + N_1 \quad (1)$$

where LEN indicating an actual length of the received packet (a positive or negative integer) is a dividend, $2^\alpha$ ($\alpha$ is a natural number) is a divisor, and $M_1$ and $N_1$ are a quotient and a remainder that are found by dividing the dividend by the divisor.

When $M_1 > N_1$ (i.e., $M_1 - N_1 > 0$) is satisfied, Equation 2 is given:

$$\frac{M_1 - N_1}{2^\alpha} = 2^\alpha M_2 + N_2 \quad (2)$$

where $M_1 - N_1$ is a dividend, $2^\alpha$ is a divisor as in Equation 1, and $M_2$ and $N_2$ are a quotient and a remainder that are found by dividing the dividend by the divisor.

Similarly, when $M_{i-1} > N_{i-1}$ (i.e., $M_{i-1} - N_{i-1} > 0$, where i is a natural number satisfying $3 \leq i \leq n-1$ and n is a natural number equal to or greater than 4) is satisfied, Equation 3 is given:

$$\frac{M_{i-1} - N_{i-1}}{2^\alpha} = 2^\alpha M_i + N_i \quad (3)$$

where $M_{i-1} - N_{i-1}$ is a dividend, $2^\alpha$ is a divisor as in the Equation 2, and $M_i$ and $N_i$ are a quotient and a remainder that are found by dividing the dividend by the divisor.

The above-described operation is performed i=n times (n is a natural number). As a result, a quotient $M_n$ and a remainder $N_n$, found by dividing the dividend by the divisor, satisfy $M_n > N_n$ (i.e., $M_n - N_n < 0$). In this case, the result of dividing the dividend by the divisor is expressed by Equation 4:

$$\frac{M_n - N_n}{2^\alpha} = 2^\alpha M_n + N_n \quad (4)$$

Equations 1 and 2, and Equations 3 and 4 including j all satisfying $3 \leq j \leq i-1$ are all added and summed. Then, a quotient and a remainder of division of LEN by $2^\alpha + 1$ are found as expressed in Equation 5:

$$LEN = (2^\alpha + 1) \sum_{k=1}^{n-1} \{(2^\alpha - 1)M_k + N_k\} + 2^\alpha(2^\alpha M_n + N_n) \quad (5)$$

None of $2^\alpha$, $2^\alpha M_n$ and $N_n$ constituting a remainder in Equation 5 is indivisible by $2^\alpha + 1$. To divide out LEN by $2^\alpha + 1$, $2^\alpha M_n + N_n$ needs to be divisible by $2^\alpha + 1$. In other words, $M_n = N_n$ is met as a necessary and sufficient condition as depicted in Equation 6:

$$\text{LEN is divisible by } 2^\alpha - 1 \Leftrightarrow M_n = N_n \quad (6)$$

Specifically, when $M_n = N_n$, Equation 5 is written as Equation 7. Thus, LEN is divisible by $2^\alpha + 1$, i.e., LEN is a multiple of $2^\alpha + 1$.

$$LEN = (2^\alpha + 1) \sum_{k=1}^{n-1} \{(2^\alpha - 1)M_k + N_k\} + 2^\alpha M_n \quad (7)$$

The first embodiment is made to solve the following problems. Conventionally, in communication performed between apparatuses that process data in wireless communication networks for mobile telephones and in communication performed between apparatuses that transmit and receive data such as IP packets, validity of a packet is determined based on a law of a fixed packet length specified between apparatuses (e.g., a multiple of 5), so as to check the validity upon receiving the packet. Then, only valid packets are processed and transmitted to another apparatus.

In conventional forwarding apparatuses, transmission and reception of a packet is controlled by the following process flow. Reception of a packet from a communication apparatus is controlled by a hardware controller, and a packet length and header information of the packet are notified to a software controller.

The software controller determines a type of a packet based on the header information, checks whether the packet has a valid length based on the law of the packet, and notifies the determination result to the hardware controller.

If the determination result received from the software controller depicts that the received packet is invalid, the hardware controller discards the packet. If the packet is valid, the hardware controller processes the packet and transmits it to another communication apparatus.

In conventional communication apparatuses that transmit and receive a high-capacity packet at high speed, such packet validity checking is performed by software calculation every time a packet is received. Therefore, processing performance (processing speed) has been a bottleneck for such communication apparatuses.

To control hardware and perform remainder operation for determining whether a certain length is a multiple of a given number, conventional communication apparatuses require a large circuit and may have difficulty in control. When a hardware circuit is used for determining whether a certain length is a multiple of a given number, for example, for checking whether a certain length is a multiple of 2, checking is performed easily by mod operation without reducing a processing speed. This is because, in the hardware circuit that well performs binary operation, a remainder operation of powers of 2 is independent from the digits of the dividend, and digits before the most significant digit of the divisor become a quotient, and digits after the most significant digit of the divisor become a remainder. Therefore, the operation can be easily performed (e.g., 1023 (b1111111111)÷4(b100)=a quotient (255) (b11111111) and a remainder 3 (b11).

When this operation is applied to checking on whether a certain length is a multiple of a value represented by (powers of 2)+1 (e.g., 5 or 9), a processing load is increased. This causes a significant reduction in processing speed compared with the checking for a multiple of 2, and an increase in circuit size. Thus, this operation is not suitable for implementation.

The first embodiment solves the above-described problems and enables a multiple determination using a simple algorithm. For example, by hardware implementation, the validity of a received packet can be checked with a simpler configuration than processing circuits and with a reduced processing load. This enables a communication apparatus to achieve improved processing performance.

Although the foregoing uses $2^\alpha$ as a divisor, the range of the divisor can be expanded to include all natural numbers. The following describes a multiple determination process when any natural number is used as a divisor. As a premise, determination is made as to whether "LEN" being a natural number equal to or greater than 2 is a multiple of an integer (A+1) (A is a natural number).

Equation 8 is given:

$$\frac{LEN}{A} = AM_1 + N_1 \quad (8)$$

where LEN is a dividend, A is a divisor, and $M_1$ and $N_1$ are a quotient and a remainder that are found by dividing the dividend by the divisor.

When $M_1 > N_1$ (i.e., $M_1 - N_1 > 0$) is satisfied, Equation 9 is given:

$$\frac{M_1 - N_1}{A} = AM_2 + N_2 \quad (9)$$

where $M_1 - N_1$ is a dividend, and A is a divisor as in Equation 8, and $M_2$ and $N_2$ are a quotient and a remainder that are found by dividing the dividend by the divisor.

Similarly, when $M_{i-1} > N_{i-1}$ (i.e., $M_{i-1} - N_{i-1} > 0$, where i is a natural number satisfying $3 \leq i \leq n-1$ and n is a natural number equal to or greater than 4) is satisfied, Equation 10 is given:

$$\frac{M_{i-1} - N_{i-1}}{A} = AM_i + N_i \quad (10)$$

where $M_{i-1} - N_{i-1}$ is a dividend, A is a divisor as in Equation 9, $M_i$ and $N_i$ are a quotient and a remainder that are found by dividing the dividend by the divisor.

The above operation is performed i=n times (n is a natural number). As a result, a quotient $M_n$ and a remainder $N_n$, found by dividing the dividend by the divisor, satisfy $M_n < N_n$ (i.e., $M_n - N_n < 0$). In this case, the result of dividing the dividend by the divisor is expressed by Equation 11:

$$\frac{M_{n-1} - N_{n-1}}{A} = AM_n + N_n \quad (11)$$

Equations 8 and 9, and Equations 10 and 11 including k all satisfying $3 \leq k \leq n$ are all added and summed. Then, a quotient and a remainder of division of LEN by A+1 are found as expressed in Equation 12:

$$LEN = (A+1)\sum_{k=1}^{n-1}\{(A-1)M_k + N_k\} + A(AM_n + N_n) \quad (12)$$

None of A, $AM_n$, and $N_n$ constituting a remainder in Equation 12 is indivisible by A+1. To divide out LEN by A+1, $AM_n + N_n$ needs to be divisible by A+1. In other words, $M_n = N_n$ is met as necessary and sufficient condition as depicted in Equation 13:

LEN is divisible by $A+1 \Leftrightarrow M_n = N_n$ (13)

Specifically, when $M_i = N_i$, Equation 12 is written as Equation 14. Thus, LEN is divisible by A+1, i.e., LEN is a multiple of A+1.

$$LEN = (A+1)\left[\sum_{k=1}^{n-1}\{(A-1)M_k + N_k\} + AM_n\right] \quad (14)$$

Mathematically, it is possible to determine whether a natural number A is a multiple of a natural number B, using the above-described algorithm. In conventional operation apparatuses, because data is handled as binary digits, the division by powers of 2 as a divisor can be performed at high speed. However, to use a value other than powers of 2 as a divisor, a larger circuit is required and the operation speed is reduced. Thus, in the conventional operation apparatuses, it is preferable that the divisor be powers of 2, or that determination be made as to whether a natural number A is a multiple of ((powers of 2)+1).

In an operational circuit that performs high-speed operation of m-adic number (m is a natural number equal to or greater than 3) other than $2^n$-adic number (n is a natural number), the above algorithm is used and whether a natural number A is a multiple of a natural number B can be determined at high speed in a compact circuit configuration.

[b] Second Embodiment

In the first embodiment, the forwarding apparatus performs the process for determining whether a received packet has a normal length. The packet checking section 101a-2 can also serve as a multiple determining circuit with a similar configuration.

Figure 8:
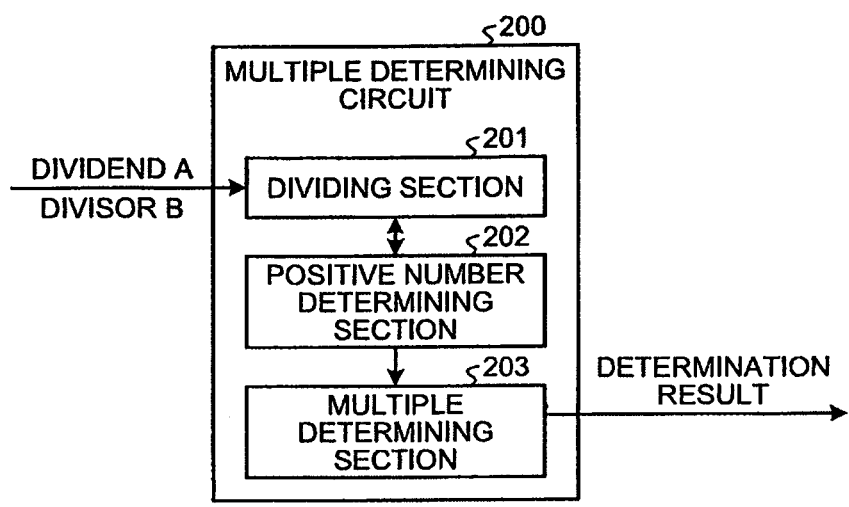
FIG. 8 is a schematic functional block diagram of a multiple determining circuit according to a second embodiment of the present invention.

The following describes a configuration of a multiple determining circuit according to a second embodiment of the present invention. FIG. 8 is a schematic functional block diagram of a multiple determining circuit. A multiple determining circuit 200 includes a dividing section 201, a positive number determining section 202, and a multiple determining section 203.

The dividing section 201 stores variables U and V as a dividend and a divisor in a work memory. The dividing section 201 sets an input dividend A (A is a non-negative integer) to U. The dividing section 201 then sets a value (B−1) found by subtracting 1 from an input divisor B (B is an integer equal to or greater than 2) to V.

U is divided by V, and a quotient $M_0$ and a remainder $N_0$ are found. If the positive number determining section 202 determines that a result of subtracting $N_0$ from $M_0$, i.e., ($M_0-N_0$), is a positive number ($M_0-N_0>0$), the dividing section 201 overwrites the subtraction result ($M_0-N_0$) to U.

The dividing section 201 then divides U by V, and a quotient $M_1$ and a remainder $N_1$ are found. The positive number determining section 202 determines whether a result of subtracting $N_1$ from $M_1$, i.e., ($M_1-N_1$), is a positive number. If the subtraction result ($M_1-N_1$) is a positive number ($M_1-N_1>0$), the dividing section 201 overwrites the subtraction result ($M_1-N_1$) to U.

Until the positive number determining section 202 determines that the result of subtracting the remainder from the quotient (both found by dividing U by V) becomes a non-positive number, the dividing section 201 repeats the above operation of dividing the subtraction result by V.

The multiple determining section 203 determines whether there is a match between a quotient and a remainder that are found when the subtraction result becomes a non-positive number. If there is a match, the multiple determining section 203 determines that A is a multiple of B. If not, the multiple determining section 203 determines that A is not a multiple of B, and outputs the determination result.

Figure 9:
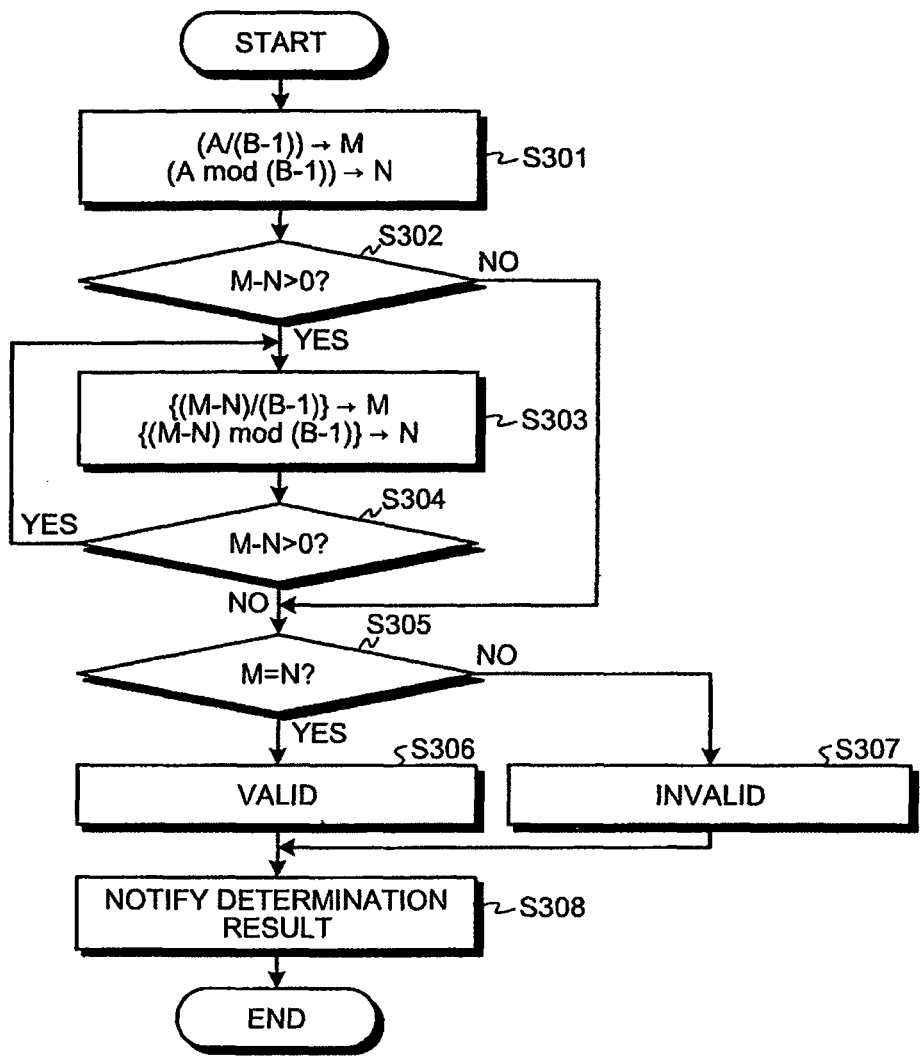
FIG. 9 is a flowchart of a procedure performed by a multiple determination process according to the second embodiment.

The following describes a multiple determination process performed by the multiple determining circuit according to the second embodiment. FIG. 9 is a flowchart of a procedure performed by a multiple determination process according to the second embodiment. As depicted in FIG. 9, the dividing section 201 sets A and B−1 (A and B are input as a dividend and a divisor) respectively to variables U (dividend) and V (divisor) to be stored in the work memory, and divides U by V. Further, the dividing section 201 sets a quotient and a remainder found as the division result respectively to the variables M and N to be stored in the work memory (Step S301). The remainder is calculated by mod operation.

The positive number determining section 202 determines whether M−N is greater than 0 (i.e., M−N is a positive number) (Step S302). If M−N is greater than 0 (YES at Step S302), the system control goes to Step S303. If not (NO at Step S302), the system control goes to Step S305.

At Step S303, the dividing section 201 overwrites M−N to U and divides U by V. The dividing section 201 then sets a quotient and a remainder found as the division result respectively to the variables M and N to be stored in the work memory.

The positive number determining section 202 determines whether M−N is greater than 0 (Step S304). If M−N is greater than 0 (YES at Step S304), the system control goes to Step S303. If not (NO at Step S304), the system control goes to Step S305.

At Step S305, the multiple determining section 203 determines whether M equals N (M=N). If M=N (YES at Step S305), the system control goes to Step S306. If not (NO at Step S305), the system control goes to Step S307.

At Step S306, the multiple determining section 203 sets a determination result Valid (A is a multiple of B (i.e., A is divisible by B)). On the contrary, at Step S307, the multiple determining section 203 sets a determination result Invalid (A is not a multiple of B (i.e., A is indivisible by B)).

At Step S308, the multiple determining section 203 outputs the determination result to an external apparatus.

The dividing section 201 may include a register setting storage unit similar to the register setting storage unit 104 of the first embodiment, and the register setting storage unit may store therein a table similar to the register setting storage table of the first embodiment. In this case, at the beginning of the multiple determination process of the second embodiment, the dividing section 201 performs steps similar to Steps S201 and S211 of the first embodiment.

In the second embodiment, a multiple determination is performed using a simple algorithm. This enables, for example, an image input apparatus or an image output apparatus to determine pixel coordinates by hardware implementation, with a reduced processing load and with a simpler configuration than processing circuits. Thus, the image input apparatus or image output apparatus achieves improved processing performance.

[c] Third Embodiment

A configuration of a forwarding apparatus according to a third embodiment of the present invention is described below with reference to FIGS. 10 to 13. The first embodiment describes that the packet length multiplication law indicates a prime number represented by $2^\alpha+1$ ($\alpha$ is a natural number). In contrast, the third embodiment describes that the packet length multiplication law indicates an integer number represented by $2^\alpha+2^\beta$ ($\alpha$ and $\beta$ are natural numbers, where $\alpha>\beta\geq 0$). The following describes differences with the first embodiment.

FIG. 10 depicts examples of an identifier for a packet length multiplication law according to the third embodiment. As depicted in FIG. 10, identifiers of corresponding packet length multiplication laws are indicated as "0" for "a multiple of ($2^\alpha+2^\beta$) (Byte, where $\alpha$ and $\beta$ are natural numbers and $\alpha>\beta\geqq0$, hereinafter), "1" for "a multiple of powers of 2", and "2" for "a fixed length".

The segment $2^\alpha+2^\beta$ is transformed as follows:

$$2^\alpha+2^\beta=2^\beta(2^{\alpha-\beta}+1) \tag{15}$$

where $\alpha>\beta\geqq0$.

The fact that the packet length of the received packet LEN (Byte) is divisible by ($2^\alpha+2^\beta$) means that LEN is divisible by each of $2^\beta$ and ($2^{\alpha-\beta}+1$). Accordingly, it is determined whether LEN is divisible by each of $2\beta$ and ($2^{\alpha-\beta}+1$).

Determining whether LEN is divisible by $2^\beta$ is performed by general shift operation (mod operation). If LEN is divisible by $2^\beta$, then determining whether LEN is divisible by ($2^{\alpha-\beta}+1$) is performed in the same manner as in the first embodiment. In this way, the packet checking process according to the first embodiment is used, so that it is possible to determine that a packet length of the received packet with a packet length multiplication law of ($2^\alpha+2^\beta$) is normal or abnormal.

FIG. 11 depicts an example of a register setting storage table according to the third embodiment. The table depicted in FIG. 11 stores "identifiers of packet length multiplication laws" depicted in FIG. 10 and their corresponding multiplication law values.

Figure 12:
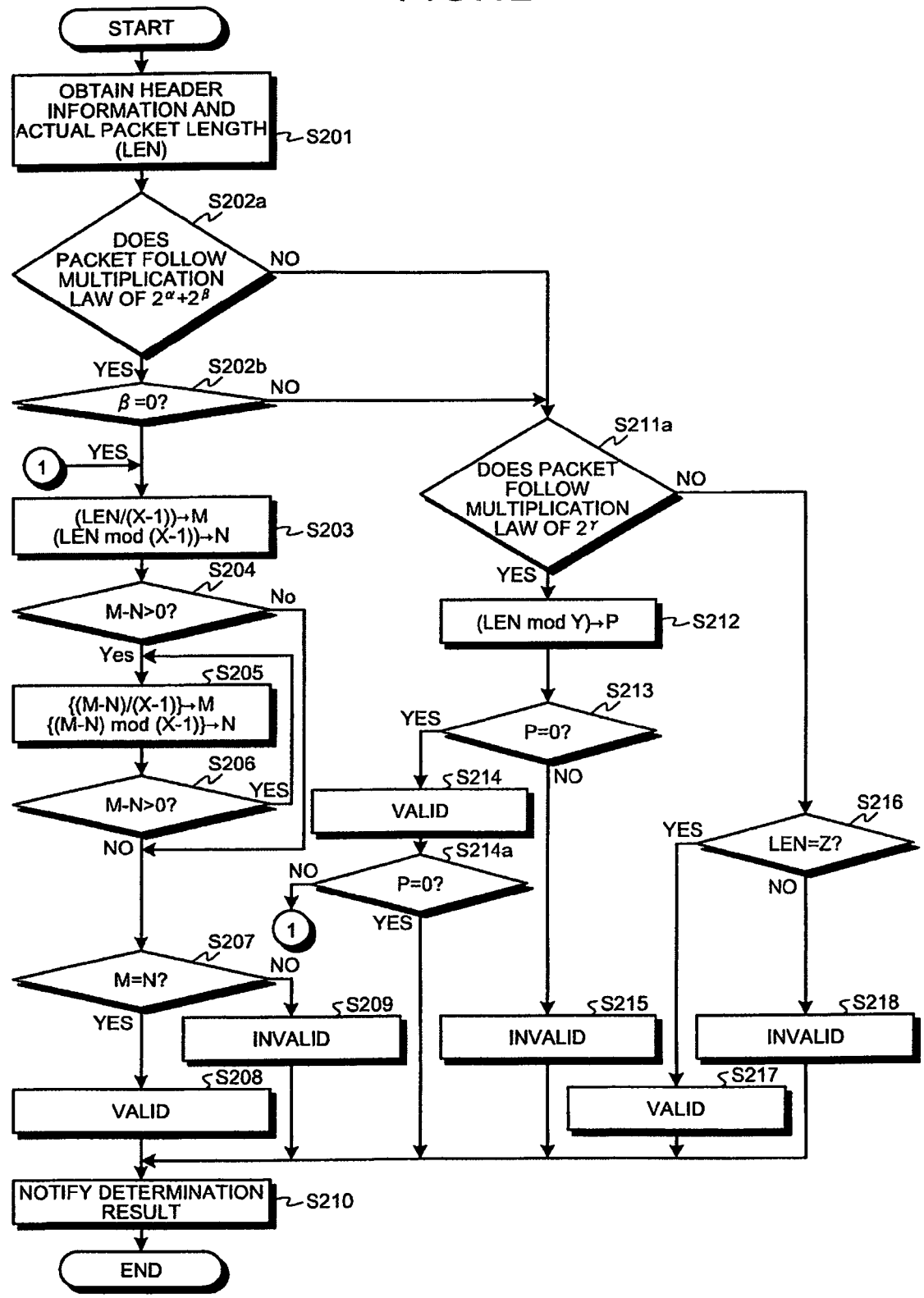
FIG. 12 is a flowchart of a packet checking process according to the third embodiment.

A packet checking process according to the third embodiment is described below with reference to FIG. 12. The following packet checking process according to the third embodiment describes differences with that of the first embodiment. The same steps are denoted by the same reference numerals as those of the first embodiment.

In the packet checking process according to the third embodiment, after Step S201, the header information determining section 105a determines whether the identifier of the packet length multiplication law is 0 (a packet following a multiplication law of ($2^\alpha+2^\beta$)) (Step S202a). If the identifier of the packet length multiplication law is 0 (YES at Step S202a), the system control goes to Step S202b. If not (NO at Step S202a), the system control goes to Step S211a.

At Step S202b, the header information determining section 105a determines whether $\beta$ of ($2^\alpha+2^\beta$) is 0. If $\beta$ is 0 (YES at Step S202b), the system control goes to Step S203. If not (NO at Step S202b), the system control goes to Step S211a. If $\beta$ is 0, the steps similar to those of the multiplication law determining process for ($2^\alpha+1$) described in the first embodiment are performed.

At Step S211a, the header information determining section 105a determines whether the received packet is a multiplication law packet with a packet length of $2^\gamma$ ($\gamma>0$). If the received packet is a multiplication law packet with a packet length of $2^\gamma$ (YES at Step S211a), the system control goes to Step S212. If not (NO at Step S211a), the system control goes to Step S216. Step S211a is substantially the same as Step S211 depicted in FIG. 6.

At Step S214a after Step S214, the header information determining section 105a determines whether P equals 0 (P=0). If P=0 (YES at Step S214a), the system control goes to Step S210. If not (NO at Step S214a), the system control goes to Step S203.

Figure 13:
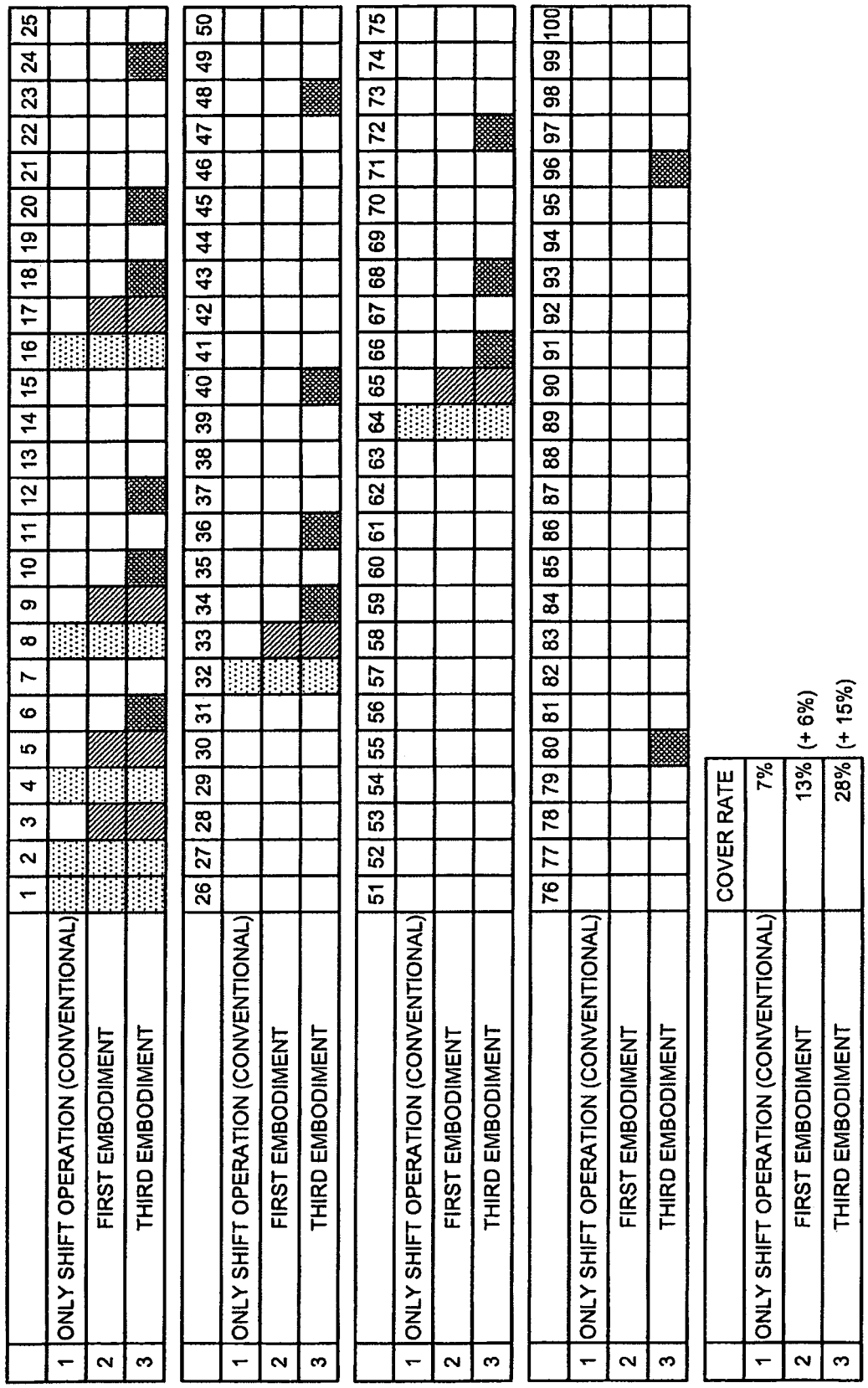
FIG. 13 depicts examples of numeric values applicable to a packet checking process according to the first and third embodiments.

As depicted in FIG. 13, numeric values corresponding to hatched areas in the table indicate natural numbers which can be subjected to the patent checking process based on the multiplication law determination using the shift operation (conventional technology) and the multiple determination of the first and third embodiments. For example, the multiplication law determination for numeric value "5" cannot be based on only the shift operation of the conventional technology but can be based on the multiple determination of the first and third embodiments.

In addition, the multiplication law determination for numeric value "6" cannot be based on only the shift operation of the conventional technology and the multiple determination of the first embodiment but can be based on the multiple determination of the third embodiment. As depicted in FIG. 13, the conventional technology can perform the packet checking process based on the multiplication law determination on, for example, no more than 7% of natural numbers "1" to "100". In contrast, the first embodiment can perform the packet checking process based on the multiplication law determination on 13% of the natural numbers. Moreover, the third embodiment can perform the packet checking process based on the multiplication law determination on 28% of the natural numbers.

In this way, the packet checking according to the third embodiment can perform the packet checking process based on the multiplication law determination on about four times the numeric values processed only by the shift operation, and thus provide high-speed multiplication law determination of any packet length. Therefore, it is possible to reduce the scale and power consumption of the packet checking circuit (or multiple determining circuit).

Figure 14:
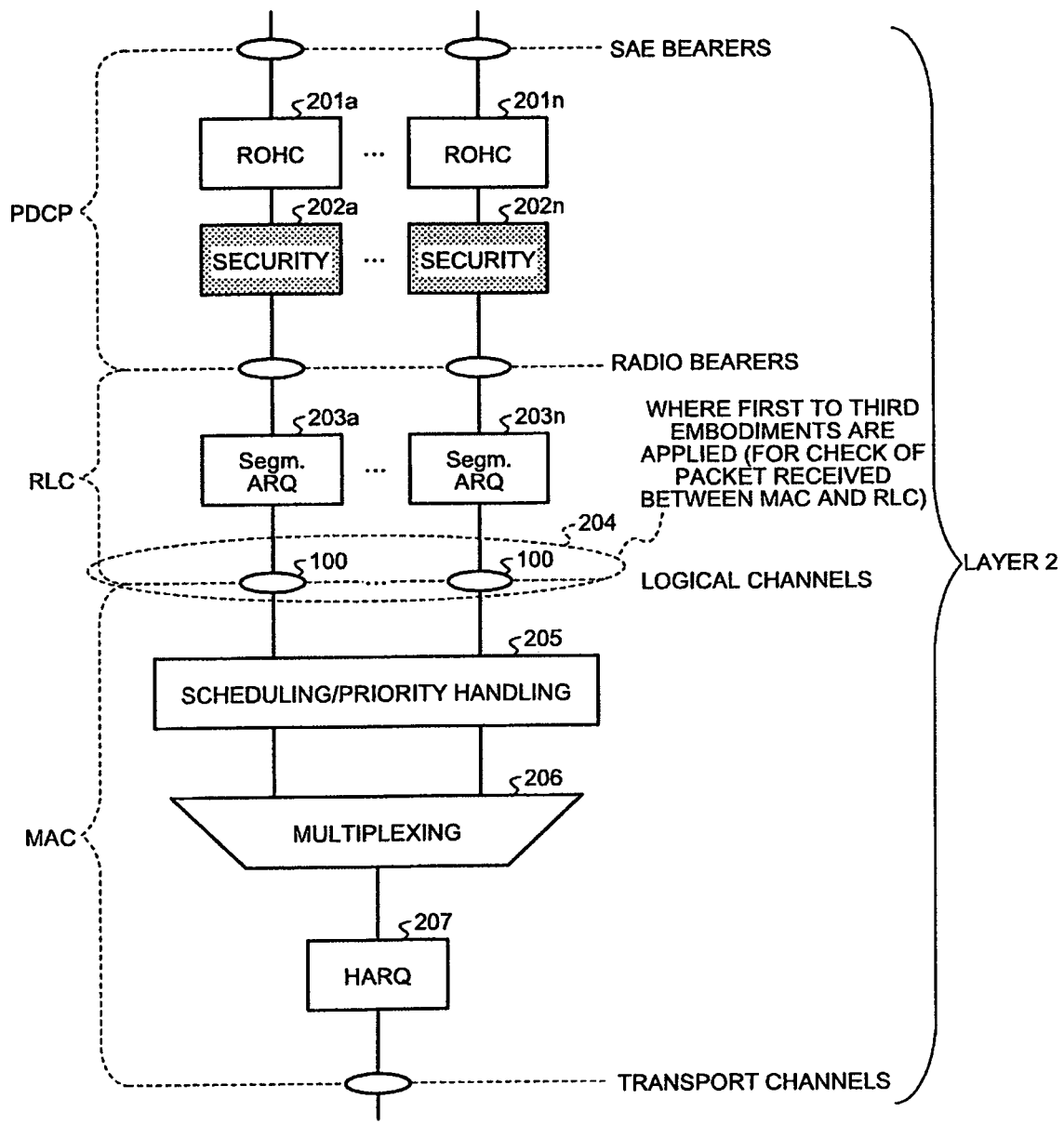
FIG. 14 depicts L2 layer of mobile phones and sections to which the first to third embodiments are applied.

FIG. 14 depicts L2 layer of mobile phones and sections to which the first to third embodiments are applied. "Layer 2" of mobile phones is divided into three sublayers: PDCP (Packet Data Convergence Protocol: functions of packet compression and extraction, decoding, and cell reselection), RLC (Radio Link Control), and MAC (Media Access Control).

The PDCP layer is a sublayer which is sectioned by SAE (System Architecture Evolution) Bearer and Radio Bearer. The PDCP layer contains ROHC (Robust Header Compression) blocks 201a, ..., 201n and Security (decoding) blocks 202a, ..., 202n.

The RLC layer is a sublayer which is sectioned by Radio Bearer and Logical Channel (logical channel control function) 204. The RLC layer contains Segment ARQ (Automatic Repeat Request: automatic retransmission control function) blocks 203a, ..., 203n.

The Logical Channel 204 includes the communication apparatuses 100 to which the first to third embodiments are applied. In other words, the first to third embodiments are applied to the packet length checking for the packets received between the MAC layer and the RLC layer.

The MAC layer is a sublayer which is sectioned by the Logical Channel 204 and Transport Channel. The MAC layer contains a scheduling/priority handling block 205, a multiplexing block (output branching switch) 206, and an HARQ (Hybrid Automatic Repeat Request: retransmission control function) 207.

In such multiple determination methods according to the first and the third embodiments, to determine whether an integer A is a multiple of an integer B (i.e., whether A is divisible by B), A is divided by (B−1) and a quotient $M_1$ and a remainder $N_1$ are found. If a difference between $M_1$ and $N_1$ ($M_1-N_1$) is a positive number, ($M_1-N_1$) is divided by (B−1). Further, a difference between a quotient $M_2$ and a remainder $N_2$ that are found as the division result ($M_2-N_2$) is a positive number, ($M_2-N_2$) is divided by (B−1).

As long as a difference between the quotient and the remainder is a positive number, the difference between the quotient and the remainder is divided by (B−1). When the difference between the quotient and the remainder becomes a non-positive number for the first time, determination is made as to whether there is a match between the quotient and the remainder. If there is a match, A is determined to be a multiple of B (i.e., A is divisible by B). If not, A is determined to be not a multiple of B (i.e., A is indivisible by B).

In this way, with simple and fewer calculations, determination is made as to whether an integer A is a multiple of an integer B (i.e., whether A is divisible by B). Due to the simple algorithm for multiple determination, a circuit configuration is simplified and a processing speed is significantly improved even by hardware implementation. When implemented by software, improved processing speed can be expected due to its compact design, though not exceeding the processing speed achieved by hardware implementation.

The foregoing describes the embodiments of the present invention, however, the invention is not limited to these and may be practiced in various modifications within technical idea recited in the appended claims. Further, advantages of the present invention are not limited to those described in the embodiments.

As to the processes described in the embodiments as being performed automatically, all of or part of the processes may be performed manually. Alternatively, as to the processes described as being performed manually, all of or part of the processes may be performed automatically by known methods. In addition, the processing procedures, controlling procedures, specific names, and information including various types of data and parameters depicted in the embodiments may be changed in any way unless otherwise specified.

Further, constituting elements depicted in the drawings indicate ideational functions, and their physical arrangements are not necessarily the same as those depicted in the drawings. Thus, the arrangement of distributing and integrating the apparatuses is not limited to those specifically depicted in the drawings, and all of or part of the apparatuses may be modified concerning functional and physical aspects based on given units, with loads on and usage of the apparatuses taken into account.

A communication apparatus according to a first aspect, determining whether received data from another communication apparatus has a size being a multiple of a prime number represented by $(2^\alpha+1)$ where $\alpha$ is a natural number, to determine whether the received data has a normal size, includes a dividend setting unit that sets a value as a dividend; a divisor setting unit that sets, as a divisor, $2^\alpha$ found by subtracting 1 from the prime number; a dividing unit that divides the dividend by the divisor to find a quotient and a remainder; a positive number determining unit that determines whether a subtraction result of subtracting the remainder from the quotient, both found by the dividing unit, is a positive number; a matching determining unit that determines, when the positive number determining unit determines that the subtraction result is a non-positive number, whether the quotient and the remainder both found by the dividing unit match; and a data size determining unit that determines, when the matching determining unit finds a match between the quotient and the remainder, that the received data has a normal size, and determines, when the matching determining unit finds no match between the quotient and the remainder, that the received data has an abnormal size, wherein the dividend setting unit sets the size of the received data as an initial value for the dividend, and sets the subtraction result to the dividend when the positive number determining unit determines that the subtraction result is a positive number.

In the communication apparatus according to the first aspect, the dividing unit may calculate the remainder by mod operation.

The communication apparatus according to the first aspect may further include a register unit that stores therein a plurality of candidate values for the predetermined integer in a rewritable manner; and a candidate value selecting unit that selects, from among the candidate values stored in the register unit, a candidate value as the predetermined integer according to a size type of the received data.

A method of checking received data according to a second aspect, performed by a communication apparatus, the communication apparatus determining whether received data from another communication apparatus has a size being a multiple of a prime number represented by $(2^\alpha+1)$ where $\alpha$ is a natural number, to determine whether the received data has a normal size, includes setting a value as a dividend; setting, as a divisor, $2^\alpha$ found by subtracting 1 from the prime number; dividing the dividend by the divisor when the value is set as the dividend, to find a quotient and a remainder; determining whether a subtraction result of subtracting the remainder from the quotient is a positive number; determining, when it is determined that the subtraction result is a non-positive number, whether the quotient and the remainder both match; and determining, when the quotient and the remainder match, that the received data has a normal size, and determining, when the quotient and the remainder do not match, that the received data has an abnormal size, wherein the setting the dividend includes setting a size of the received data as an initial value for the dividend, and setting the subtraction result to the dividend when it is determined that the subtraction result is a positive number.

A communication apparatus according to a third aspect, determining whether received data from another communication apparatus has a size being a multiple of an integer number, so as to determine whether the received data has a normal size, includes a dividend setting unit that sets a value as a dividend; a divisor setting unit that sets, as a divisor, a value found by subtracting 1 from the integer number; a dividing unit that divides the dividend by the divisor when the dividend setting unit sets a value as the dividend, so as to find a quotient and a remainder; a positive number determining unit that determines whether a subtraction result of subtracting the remainder from the quotient, both found by the dividing unit, is a positive number; a matching determining unit that determines, when the positive number determining unit determines that the subtraction result is a non-positive number, whether the quotient and the remainder both found by the dividing unit match; and a data size determining unit that determines, when the matching determining unit finds a match between the quotient and the remainder, that the received data has a normal size, and determines, when the matching determining unit finds no match between the quotient and the remainder, that the received data has an abnormal size, wherein the dividend setting unit sets the size of the received data as an initial value for the dividend, and sets the subtraction result to the dividend when the positive number determining unit determines that the subtraction result is a positive number.

In the communication apparatus according to the third aspect, the dividing unit may calculate the remainder by mod operation.

The communication apparatus according to the third aspect may further include a register unit that stores therein a plurality of candidate values for the predetermined integer in a rewritable manner; and a candidate value selecting unit that selects, from among the candidate values stored in the register unit, a candidate value as the predetermined integer according to a size type of the received data.

A method of checking received data according to a fourth aspect, performed by a communication apparatus, the communication apparatus determining whether received data from another communication apparatus has a size being a multiple of an integer number, to determine whether the received data has a normal size, includes setting a value as a dividend; setting, as a divisor, a value found by subtracting 1 from the integer number; dividing the dividend by the divisor when the value is set as the dividend, to find a quotient and a remainder; determining whether a subtraction result of subtracting the remainder from the quotient is a positive number; determining, when it is determined that the subtraction result is a non-positive number, whether the quotient and the remainder both match; and determining, when the quotient and the remainder match, that the received data has a normal size, and determining, when the quotient and the remainder do not match, that the received data has an abnormal size, wherein the setting the dividend includes setting a size of the received data as an initial value for the dividend, and setting the subtraction result to the dividend when it is determined that the subtraction result is a positive number.

A multiple determination method according to a fifth aspect, performed by a multiple determining circuit, the multiple determining circuit determining whether a first integer is a multiple of a second integer represented by $(2^\alpha+2^\beta)$ where $\alpha$ and $\beta$ are natural numbers and $\alpha>\beta\geqq0$, includes setting a value as a dividend; setting, as a divisor, $2^\beta(2^{\alpha-\beta}+1)$ transformed from $(2^\alpha+2^\beta)$; determining whether a remainder found by dividing the dividend by $2^\beta$ which is a factor of $2^\beta(2^{\alpha-\beta}+1)$ is 0; setting, as the divisor, $2^{\alpha-\beta}$ found by subtracting 1 from $(2^{\alpha-\beta}+1)$ which is a factor of $2^\beta(2^{\alpha-\beta}+1)$ when it is determined that the remainder found by dividing the dividend by $2^\beta$ is 0; dividing the dividend by the divisor to find a quotient and a remainder when $2^{\alpha-\beta}$ is set as the dividend; determining whether a subtraction result of subtracting the remainder from the quotient is a positive number; determining, when it is determined the subtraction result is a non-positive number, whether the quotient and the remainder match; and determining, when the quotient and the remainder match, that the first integer is a multiple of the second integer, and determining, when the quotient and the remainder do not match, that the first integer is not a multiple of the second integer, wherein the determining whether the remainder is 0 includes, when it is not determined that the remainder found by dividing the dividend by $2^\beta$ is 0, determining that the first integer is not a multiple of the second integer, and the setting the dividend includes setting the first integer as an initial value for the dividend, and setting the subtraction result to the dividend when it is determined that the subtraction result is a positive number.

A multiple determining circuit according to a sixth aspect, determining whether a first integer is a multiple of a second integer being a prime number represented by $(2^\alpha+1)$ where $\alpha$ is a natural number, includes a dividend setting unit that sets a value as a dividend; a divisor setting unit that sets, as a divisor, $2^\alpha$ found by subtracting 1 from the second integer; a dividing unit that divides the dividend by the divisor when the dividend setting unit sets a value as the dividend, to find a quotient and a remainder; a positive number determining unit that determines whether a subtraction result of subtracting the remainder from the quotient, both found by the dividing unit, is a positive number; a matching determining unit that determines, when the positive number determining unit determines the subtraction result is a non-positive number, whether the quotient and the remainder both found by the dividing unit match; and a multiple determining unit that determines, when the matching determining unit finds a match between the quotient and the remainder, that the first integer is a multiple of the second integer, and determines, when the matching determining unit finds no match between the quotient and the remainder, that the first integer is not a multiple of the second integer, wherein the dividend setting unit sets the first integer as an initial value for the dividend, and sets the subtraction result to the dividend when the positive number determining unit determines that the subtraction result is a positive number.

In the multiple determining circuit according to the sixth aspect, the dividing unit may calculate the remainder by mod operation.

The multiple determining circuit according to the sixth aspect may further include a register unit that stores therein a plurality of candidate values for the second integer in a rewritable manner; and a candidate value selecting unit that selects, from among the candidate values stored in the register unit, a candidate value as the second integer according to a type of the first integer.

A multiple determination method according to a seventh aspect, performed by a multiple determining circuit, the multiple determining circuit determining whether a first integer is a multiple of a second integer being a prime number represented by $(2^\alpha+1)$ where $\alpha$ is a natural number, includes setting, as a divisor, $2^\alpha$ found by subtracting 1 from the second integer; setting a value as a dividend; dividing the dividend by the divisor when the value is set as the dividend, to find a quotient and a remainder; determining whether a subtraction result of subtracting the remainder from the quotient is a positive number; determining, when it is determined the subtraction result is a non-positive number, whether the quotient and the remainder match; and determining, when the quotient and the remainder match, that the first integer is a multiple of the second integer, and determining, when the quotient and the remainder do not match, that the first integer is not a multiple of the second integer, wherein the setting the dividend includes setting the first integer as an initial value for the dividend, and setting the subtraction result to the dividend when it is determined that the subtraction result is a positive number.

A multiple determining circuit according to an eighth aspect, determining whether a first integer is a multiple of a second integer, includes a divisor setting unit that sets, as a divisor, a value found by subtracting 1 from the second integer; a dividend setting unit that sets a value as a dividend; a dividing unit that divides the dividend by the divisor when the dividend setting unit sets a value as the dividend, to find a quotient and a remainder; a positive number determining unit that determines whether a subtraction result of subtracting the remainder from the quotient, both found by the dividing unit, is a positive number; a matching determining unit that determines, when the positive number determining unit determines the subtraction result is a non-positive number, whether the quotient and the remainder both found by the dividing unit match; and a multiple determining unit that determines, when the matching determining unit finds a match between the quotient and the remainder, that the first integer is a multiple of the second integer, and determines, when the matching determining unit finds no match between the quotient and the remainder, that the first integer is not a multiple of the second integer, wherein the dividend setting unit sets the first integer as an initial value for the dividend, and sets the subtraction result to the dividend when the positive number determining unit determines that the subtraction result is a positive number.

In the multiple determining circuit according to the eighth aspect, the dividing unit may calculate the remainder by mod operation.

The multiple determining circuit according to the eighth aspect may further include a register unit that stores therein a plurality of candidate values for the second integer in a rewritable manner; and a candidate value selecting unit that selects, from among the candidate values stored in the register unit, a candidate value as the second integer according to a type of the first integer.

A multiple determination method according to a ninth aspect, performed by a multiple determining circuit, the multiple determining circuit determining whether a first integer is a multiple of a second integer, includes setting, as a divisor, a value found by subtracting 1 from the second integer; setting a value as a dividend; dividing the dividend by the divisor when the value is set as the dividend, to find a quotient and a remainder; determining whether a subtraction result of subtracting the remainder from the quotient is a positive number; determining, when it is determined the subtraction result is a non-positive number, whether the quotient and the remainder match; and determining, when the quotient and the remainder match, that the first integer is a multiple of the second integer, and determining, when the quotient and the remainder do not match, that the first integer is not a multiple of the second integer, wherein the setting the dividend includes setting the first integer as an initial value for the dividend, and setting the subtraction result to the dividend when it is determined that the subtraction result is a positive number.

According to an embodiment of the present invention, a size of received data is divided by a value found by subtracting 1 from a predetermined integer (e.g., a prime number represented by $(2^\alpha+2^\beta)$ ($\alpha$ and $\beta$ are natural numbers, where $\alpha > \beta \geqq 0$) or $(2^\alpha+1)$ ($\alpha$ is a natural number)), and a quotient and a remainder are found. If a subtraction result of subtracting the remainder from the quotient is a positive number, the subtraction result is divided by the value found by subtracting 1 from the predetermined integer, and a quotient and a remainder are found. Then, determination is made as to whether a subtraction result of subtracting the remainder from the quotient is a positive number. If the subtraction result is an integer, the subtraction result is divided by the value found by subtracting 1 from the predetermined integer, a quotient and a remainder are found, and the quotient is divided by the remainder. Such operations are repeated until the subtraction result becomes a non-positive number. When the subtraction result becomes a non-positive number, whether there is a match between the quotient and the remainder is determined. If there is a match, the received data is determined to have a normal size. If not, the received data is determined to have an abnormal size. With this arrangement, whether the received data has a normal size can be determined quickly by simple processing. Further, the simple processing enables compact design. This is advantageous for hardware implementation.

According to an embodiment of the present invention, a remainder is calculated at high speed only with mod operation (shift operation). Thus, whether received data has a normal size can be determined quickly by simple processing.

According to an embodiment of the present invention, to determine whether received data has a normal size, a predetermined integer is selected according to a size type of the received data. This allows determination to be made flexibly as to whether the received data has a normal size, thus improving efficiency of the determination process.

According to an embodiment of the present invention, a first integer is divided by a second integer (e.g., a prime number represented by $(2^\alpha+2^\beta)$ ($\alpha$ and $\beta$ are natural numbers, where $\alpha > \beta \geqq 0$) or $(2^\alpha+1)$ ($\alpha$ is a natural number)), and a quotient and a remainder are found. If a subtraction result of subtracting the remainder from the quotient is a positive number, the subtraction result is divided by a value found by subtracting 1 from the second number, and a quotient and a remainder are found. Then, determination is made as to whether a subtraction result of subtracting the remainder from the quotient is a positive number. If the subtraction result is an integer, the subtraction result is divided by the value found by subtracting 1 from the second integer, a quotient and a remainder are found, and the quotient is divided by the remainder. Such operations are repeated until the subtraction result becomes a non-positive number. When the subtraction result becomes a non-positive number, whether there is a match between the quotient and the remainder is determined. If there is a match, the first integer is determined to be a multiple of the second integer. If not, the first integer is determined to be not a multiple of the second integer. With this arrangement, whether the first integer is a multiple of the second integer can be determined quickly by simple processing. Further, the simple processing enables a compact design. This is advantageous for hardware implementation.

According to an embodiment of the present invention, a remainder is calculated at high speed only with mod operation (shift operation). Thus, whether a first integer is a multiple of a second integer (e.g., a prime number represented by $(2^\alpha+2^\beta)$ ($\alpha$ and $\beta$ are natural numbers, where $\alpha > \beta \geqq 0$) or $(2^\alpha+1)$ ($\alpha$ is a natural number)) can be determined quickly by simple processing.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication apparatus, determining whether received data from another communication apparatus has a size being a multiple of an integer number represented by $(2^\alpha+2^\beta)$ where $\alpha$ and $\beta$ are natural numbers and $\alpha > \alpha \geqq 0$, to determine whether the received data has a normal size, the communication apparatus comprising:
   a dividend setting unit that sets a value as a dividend;
   a first divisor setting unit that sets, as a divisor, $2^\beta(2^{\alpha-\beta}+1)$ transformed from $(2^\alpha+2^\beta)$;
   a remainder determining unit that determines whether a remainder found by dividing the dividend by $2^\beta$ which is a factor of $2^\beta(2^{\alpha-\beta}+1)$ is 0;
   a second divisor setting unit that sets, as the divisor, $2^{\alpha-\beta}$ found by subtracting 1 from $(2^{\alpha-\beta}+1)$ which is a factor of $2^\beta(2^{\alpha-\beta}+1)$ when the remainder determining unit determines that the remainder found by dividing the dividend by $2^\beta$ is 0;
   a dividing unit that divides the dividend by the divisor to find a quotient and a remainder when the second divisor setting unit sets $2^{\alpha-\beta}$ as the divisor;
   a positive number determining unit that determines whether a subtraction result of subtracting the remainder from the quotient, both found by the dividing unit, is a positive number;
   a matching determining unit that determines, when the positive number determining unit determines that the subtraction result is a non-positive number, whether the quotient and the remainder both found by the dividing unit match; and a data size determining unit that determines, when the matching determining unit finds a match between the quotient and the remainder, that the received data has a normal size, and determines, when the matching determining unit finds no match between the quotient and the remainder, that the received data has an abnormal size, wherein the remainder determining unit, when not determining that the remainder found by dividing the dividend by $2^\beta$ is 0, determines that the received data has an abnormal size, and the dividend setting unit sets the size of the received data as an initial value for the dividend, and sets the subtraction result to the dividend when the positive number determining unit determines that the subtraction result is a positive number.

2. The communication apparatus according to claim 1, wherein the dividing unit calculates the remainder by mod operation.

3. The communication apparatus according to claim 1, further comprising:
   a register unit that stores therein a plurality of candidate values for the integer number in a rewritable manner; and
   a candidate value selecting unit that selects, from among the candidate values stored in the register unit, a candidate value as the integer number according to a size type of the received data.

4. A method of checking received data, performed by a communication apparatus, the communication apparatus determining whether received data from another communication apparatus has a size being a multiple of an integer number represented by $(2^\alpha+2^\beta)$ where $\alpha$ and $\beta$ are natural numbers and $\alpha>\beta\geq 0$, to determine whether the received data has a normal size, the method comprising:
   first setting a value as a dividend;
   second setting, as a divisor, $2^\beta(2^{\alpha-\beta}+1)$ transformed from $(2^\alpha+2^\beta)$;
   first determining whether a remainder found by dividing the dividend by $2^\beta$ which is a factor of $2^\beta(2^{\alpha-\beta}+1)$ is 0;
   third setting, as the divisor, $2^{\alpha-\beta}$ found by subtracting 1 from $(2^{\alpha-\beta}+1)$ which is a factor of $2^\beta(2^{\alpha-\beta}+1)$ when the determining determines that the remainder found by dividing the dividend by $2^\beta$ is 0;
   dividing the dividend by the divisor to find a quotient and a remainder when $2^{\alpha-\beta}$ is set as the divisor;
   second determining whether a subtraction result of subtracting the remainder from the quotient is a positive number;
   third determining, when it is determined that the subtraction result is a non-positive number, whether the quotient and the remainder both found at the dividing match; and
   fourth determining, when the quotient and the remainder match, that the received data has a normal size, and determining, when the quotient and the remainder do not match, that the received data has an abnormal size, wherein the first determining includes, when it is not determined that the remainder found by dividing the dividend by $2^\beta$ is 0, determining that the received data does not has a normal size, and the first setting includes setting a size of the received data as an initial value for the dividend, and setting the subtraction result to the dividend when it is determined that the subtraction result is a positive number.

5. A multiple determining circuit, determining whether a first integer is a multiple of a second integer represented by $(2^\alpha+2^\beta)$ where $\alpha$ and $\beta$ are natural numbers and $\alpha>\beta\geq 0$, the multiple determining circuit comprising:
   a dividend setting unit that sets a value as a dividend;
   a first divisor setting unit that sets, as a divisor, $2^\beta(2^{\alpha-\beta}+1)$ transformed from $(2^\alpha+2^\beta)$;
   a remainder determining unit that determines whether a remainder found by dividing the dividend by $2^\beta$ which is a factor of $2^\beta(2^{\alpha-\beta}+1)$ is 0;
   a second divisor setting unit that sets, as the divisor, $2^{\alpha-\beta}$ found by subtracting 1 from $(2^{\alpha-\beta}+1)$ which is a factor of $2^\beta(2^{\alpha-\beta}+1)$ when the remainder determining unit determines that the remainder found by dividing the dividend by $2^\beta$ is 0;
   a dividing unit that divides the dividend by the divisor to find a quotient and a remainder when the second divisor setting unit sets $2^{\alpha-\beta}$ as the divisor;
   a positive number determining unit that determines whether a subtraction result of subtracting the remainder from the quotient, both found by the dividing unit, is a positive number;
   a matching determining unit that determines, when the positive number determining unit determines that the subtraction result is a non-positive number, whether the quotient and the remainder both found by the dividing unit match; and
   a data size determining unit that determines, when the matching determining unit finds a match between the quotient and the remainder, that the first integer is a multiple of the second integer, and determines, when the matching determining unit finds no match between the quotient and the remainder, that the first integer is not a multiple of the second integer, wherein the remainder determining unit, when not determining that the remainder found by dividing the dividend by $2^\beta$ is 0, determines that the first integer is not a multiple of the second integer, and the dividend setting unit sets the first integer as an initial value for the dividend, and sets the subtraction result to the dividend when the positive number determining unit determines that the subtraction result is a positive number.

6. The multiple determining circuit according to claim 5, wherein the dividing unit calculates the remainder by mod operation.

7. The multiple determining circuit according to claim 5, further comprising:
   a register unit that stores therein a plurality of candidate values for the second integer in a rewritable manner; and
   a candidate value selecting unit that selects, from among the candidate values stored in the register unit, a candidate value as the second integer according to a type of the first integer.

* * * * *